US012408138B2

(12) United States Patent
Shreevastav et al.

(10) Patent No.: US 12,408,138 B2
(45) Date of Patent: Sep. 2, 2025

(54) METHODS AND SYSTEMS TO DEFINE INTEGRITY FOR INDUSTRIAL INTERNET OF THINGS

(71) Applicant: Telefonaktiebolaget LM Ericsson (PUBL), Stockholm (SE)

(72) Inventors: Ritesh Shreevastav, Upplands Väsby (SE); Iana Siomina, Täby (SE); Sara Modarres Razavi, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 403 days.

(21) Appl. No.: 18/040,305

(22) PCT Filed: Aug. 5, 2021

(86) PCT No.: PCT/IB2021/057210
§ 371 (c)(1),
(2) Date: Feb. 2, 2023

(87) PCT Pub. No.: WO2022/029683
PCT Pub. Date: Feb. 10, 2022

(65) Prior Publication Data
US 2023/0362878 A1    Nov. 9, 2023

Related U.S. Application Data

(60) Provisional application No. 63/062,000, filed on Aug. 6, 2020.

(51) Int. Cl.
*H04W 64/00*    (2009.01)
*G16Y 10/75*    (2020.01)
(Continued)

(52) U.S. Cl.
CPC .......... *H04W 64/006* (2013.01); *G16Y 10/75* (2020.01); *G16Y 20/10* (2020.01); *G16Y 40/60* (2020.01); *H04W 8/30* (2013.01)

(58) Field of Classification Search
CPC ...... H04W 64/006; H04W 8/30; G16Y 20/10; G16Y 10/75; G16Y 40/60
See application file for complete search history.

(56) References Cited

U.S. PATENT DOCUMENTS

2010/0222081 A1    9/2010  Ward et al.
2021/0266746 A1*   8/2021  Antolinos ............. H04W 4/029

FOREIGN PATENT DOCUMENTS

WO    2021 164450 A1    8/2021
WO    2021 198983 A1    10/2021

OTHER PUBLICATIONS

PCT International Search Report issued for International application No. PCT/IB2021/057210—Nov. 5, 2021.
(Continued)

*Primary Examiner* — Samina F Choudhry
(74) *Attorney, Agent, or Firm* — Baker Botts L.L.P.

(57) ABSTRACT

A method performed by a wireless device in an Industrial Internet of Things (I-IoT) environment includes determining an availability level of a network and/or an integrity level of a positioning service and/or system at the wireless device. Based on the availability level of the network and/or the integrity level of the positioning service and/or system at the wireless device, the wireless device performs at least one action associated with the positioning service and/or system.

27 Claims, 20 Drawing Sheets

(51) Int. Cl.
*G16Y 20/10* (2020.01)
*G16Y 40/60* (2020.01)
*H04W 8/30* (2009.01)

(56) References Cited

OTHER PUBLICATIONS

PCT Written Opinion of the International Searching Authority issued for International application No. PCT/IB2021/057210—Nov. 5, 2021.

\* cited by examiner

✓ Reliable, Precise
✓ Accurate, Valid
✓ Consistant
✓ High confidence level
✓ High integrity ✗ Unreliable, Imprecise
✓ Accurate, Valid
✗ Inconstant
✗ Low confidence level
✗ Lack of integrity ✓ Reliable, Precise
✗ Inaccurate, Invalid
✓ Consistant
✓ High confidence level
✗ Lack of integrity ✗ Unreliable, Imprecise
✗ Inaccurate, Invalid
✗ Inconsistant
✗ Low confidence level
✗ No integrity

FIGURE 2

METHODS AND SYSTEMS TO DEFINE INTEGRITY FOR INDUSTRIAL INTERNET OF THINGS

PRIORITY

This nonprovisional application is a U.S. National Stage Filing under 35 U.S.C. § 371 of International Patent Application Serial No. PCT/IB2021/057210 filed Aug. 5, 2021 and entitled "Methods and Systems to Define Integrity for Industrial Internet of Things" which claims priority to U.S. Provisional Patent Application No. 63/062,000 filed Aug. 6, 2020 both of which are hereby incorporated by reference in their entirety.

TECHNICAL FIELD

The present disclosure relates, in general, to wireless communications and, more particularly, systems and methods for defining integrity for Industrial Internet of Things (I-IoT).

BACKGROUND

Positioning has been a topic in Long Term Evolution (LTE) standardization since 3GPP Release 9. The primary objective is to fulfill regulatory requirements for emergency call positioning. Positioning in New Radio (NR) has been proposed to be supported by the architecture shown in FIG. 1. Specifically, FIG. 1 illustrates NG-RAN Rel-IS Location Services (LCS) Protocols. The gNodeB (gNB) and Next Generation eNodeB (ng-eNB) may not always be present. When both the gNB and ng-eNB are present, the Next Generation Core (NG-C) Interface is only present for one of the gNB and ng-eNB.

As depicted in FIG. 1, Location Management Function (LMF) is the location node in NR. There are also interactions between the location node and the gNB via the New Radio Positioning Protocol Annex (NRPPa) protocol. The interactions between the gNB and the device is supported via the Radio Resource Control (RRC) protocol.

In the legacy LIE standards, the following techniques are supported:
  Enhanced Cell Identifier (Cell ID): Essentially Cell ID information to associate the device to the serving area of a serving cell, and then additional information to determine a finer granularity position.
  Assisted Global Navigation Satellite Systems (GNSS): GNSS information retrieved by the device, supported by assistance information provided to the device from Enhanced-Serving Mobile Location Center (E-SMLC)
  Observed Time Difference of Arrival (OTDOA): The device estimates the time difference of reference signals from different base stations and sends to the E-SMLC for multilateration.
  UTDOA (Uplink TDOA): The device is requested to transmit a specific waveform that is detected by multiple location measurement units (e.g. an eNB) at known positions. These measurements are forwarded to E-SMLC for multilateration
  Sensor methods such as Biometric pressure sensor which provides vertical position of the device and Inertial Motion Unit (IMU) which provides displacement.

All of these methods are also being standardized for NR in Rel-15 (limited functionality) and Rel-16 and planned to be enhanced in Rel-17.

The positioning modes can be categorized into three areas:
  UE-Assisted: The User Equipment (UE) performs measurements with or without assistance from the network and sends these measurements to the E-SMLC where the position calculation may take place.
  UE-Based: The UE performs measurements and calculates its own position with assistance from the network (network-assisted).
  Standalone: The LIE performs measurements and calculates its own without network assistance.

In 3GPP Rel-16, a new downlink Positioning reference signal (DL-PRS) has been defined for NR. The DL-PRS is transmitted by gNB. The gNB provides the detailed DL-PRS related information to LMF via Operation. Administration and Maintenance (OAM) or NR Positioning Protocol A (NRPPa). LMF then prepares and sends the DL-PRS configuration to the UE Further, Uplink-Sounding Reference Signal (UL-SRS) for positioning has been also defined which is configured by Radio Resource Control (RRC). LMF may recommend the number of resource sets and resources for UL SRS along with spatial relations.

Until now, accuracy has been the main positioning performance metrics which have been discussed and supported by the requirements in 3GPP. Emerging applications relying on high-precision positioning technology in autonomous applications (e.g., automotive), has brought with it the need for high integrity and reliability in addition to high accuracy. The 5G service requirements specified in 3GPP TS 22.261 include the need to determine the reliability, integrity, and the availability of the position-related service.

In RP-193237, a new SI on "New SID on NR Positioning Enhancements" has been approved in which one of the two objectives is to:
  Study solutions necessary to support integrity and reliability of assistance data and position information: [RAN2]
    Identify positioning integrity KPIs and relevant use cases.
    Identify the error sources, threat models, occurrence rates and failure modes requiring positioning integrity validation and reporting.
    Study methodologies for network-assisted and UE-assisted integrity.

Integrity is the measure of trust that can be placed in the correctness of information_supplied by a navigation/location system. For example, integrity includes the ability of a system to provide timely warnings to user receivers in case of a failure. Example of a failure can be taken from Radio Access Technology (RAT) independent positioning method such as Assisted GNSS. For example, if a satellite is malfunctioning, it should be detected by the system and should be informed to the user saying do not use this satellite.

Example use cases and scenarios: Any use-case related to positioning in Ultra Reliable Low Latency Communication (URLLC) naturally requires high integrity performance. Some example use-cases comprise Vehicle-to-Any (V2X), autonomous driving. Unmanned aerial vehicles (UAV) (drones), eHealth, rail and maritime, emergency and mission critical. In use-cases in which large errors can lead to serious consequences such as health-related impacts, wrong legal decisions or wrong charge computation, etc., the integrity reporting becomes crucial.

FIG. 2 illustrates example definitions of accuracy, precision, validity, reliability and integrity. Basically, it can be concluded that accuracy is the same term as validity in positioning. Also, terms such as reliability, precision, uncertainty and confidence level can in some cases be used interchangeably. However, integrity requires the evaluation of both accuracy and reliability.

There are below few example Integrity KPIs defined that can help us in identifying different integrity events.

Alert Limit (AL): is the largest error allowable for safe operation.

Time to Alert (TTA): is the maximum allowable elapsed time from the onset of a positioning failure until the equipment announces the alert.

Integrity Risk (IR): is the maximum probability of providing a signal that is out of tolerance without warning the user in a given period of time.

Protection Level (PL): is the statistical error bound computed to guarantee that the probability of the absolute position error exceeding the said number is smaller than or equal to the target integrity risk.

FIG. 3 illustrates an example with the Stanford plot in which all the possible integrity operation and events can be explained in its different regions. The terms in FIG. 3 may be understood as follows:

Nominal Operation is when PE<PL<AL
System unavailable is when AL<PL
Misleading Operation is when PL<PE
Hazardously Operation is when PL<AL<PE
Integrity Failure is an integrity event that lasts for longer than the TTA and with no alarm raised within the TTA.
Misleading Information (MI) is an integrity event occurring when, being the system declared available, the position error exceeds the protection level but not the alert limit.
Hazardously Misleading Information (HMI) is an integrity event occurring when, being the system declared available, the position error exceeds the alert limit.

With regard to positioning integrity requirements in I-IOT, 3GPP TR 22.804 states:

| Factories of the future 10.8 | The 5G system shall support an indoor positioning service with horizontal positioning accuracy better than 1 m, 99% availability, heading <10 degrees and latency for positioning estimation <15 ms for a moving UE with speed up to 10 km/h. |
|---|---|

There are tour measures that can evaluate the performance of a system:
1—Accuracy
2—Integrity
3—Availability
4—Continuity The availability of a location service is a requirement for some applications. For I-IOT applications the availability needs to be above 99%.

In a positioning system, availability is the percentage of time when the system is able to provide the required location-related data within the agreed level of accuracy and integrity.

Further positioning accuracy need to be better than 1 m and latency less than 15 ms.

Rel-17 focuses on I-Internet of Things (I-IOT):
1. Study enhancements and solutions necessary to support the high accuracy (horizontal and vertical), low latency, network efficiency (scalability, Reference Signal (RS) overhead, etc.), and device efficiency (power consumption, complexity, etc.) requirements for commercial uses cases (incl. general commercial use cases and specifically (I)IoT use cases as exemplified in section 3 above (Justification));
2. Define additional scenarios (e.g. Industrial-IoT ((I)IoT or IIoT or I-IoT) based on 3GPP TR 38.901 to evaluate the performance for the use cases (e.g. (I)IoT). [RAN1]
3. Evaluate the achievable positioning accuracy and latency with the Rel-16 positioning solutions in (I)IoT scenarios and identify any performance gaps. [RAN1]

Thus, Positioning Integrity solutions more applicable to I-IOT is required. For I-IOT application, they have requirement of high percentage of availability.

System availability is the percentage of time the positioning method itself (hardware and software components) is available and/or operational. It takes into account usual system "Reliability, Availability and Maintainability" considerations.

System latency is the time elapsed between the reception of the positioning request from the application module and the provision of the associated answer. This latency is driven by the time taken to conduct positioning operations, including location target position determination through sensor measurements, and in case of a distributed system the performance of the communication channel.

Service area coverage represents the area the location target can travel across and still be positioned. This depends on the type of positioning techniques used, the type of environment across the service. Other examples may be found in US Patent Publication No. 2010/0222081.

Certain problems exist. For example, in the current positioning support of LTE and NR systems there is no functionality or signaling support in the network or UE for positioning integrity control designed for I-IOT. I-IOT applications require positioning accuracy of less than 1 m and latency less than 15 s. Hence, there is need for fast signaling and uncertainly model to be more suitable/tuned for I-IOT scenarios.

Integrity support for UE operating in IDLE or INACTIVE modes is lacking and is also important for I-IOT.

The Positioning integrity also impacts on how effective the UE will report to the network regarding the uncertainty or determine its location. There may be a difference between the true position and observed position.

3GPP TS 23.032 specifies the uncertainty model for high accuracy (HA) uncertainty as follows:

High Accuracy Uncertainty

The high accuracy uncertainty r, expressed in metres, is mapped to a number K, with the following formula:

$$r = C((1+x)^K - 1)$$

with C=0.3 and x=0.02. With 0<=K<=255, a suitably useful range between 0 and 46.49129 metres is achieved for the high accuracy uncertainty, while still being able to code down to values as small as 6 millimetre. The uncertainty can then be coded on 8 bits, as the binary encoding of K.

The high accuracy uncertainty is not suitable for I-IOT as the uncertainty need to be defined basically within 1 m resolution and not up to tens of meters (i.e. 50 m).

Latency is another factor that needs to be considered. Thus, lean signaling should be designed Further, the availability should be above 99%.

Therefore, it may be concluded that currently there is only the accuracy uncertainty for positioning result and measurements, which has been defined and the ranges for that are also not suitable for the I-IoT use-cases. Moreover, there is no particular support of positioning latency and availability measures in the standard.

SUMMARY

Certain aspects of the present disclosure and their embodiments may provide solutions to these or other challenges. For example, according to certain embodiments, methods and systems are provided to identity and/or define the availability of positioning system for I-IoT.

According to certain embodiments a method by a wireless device in an I-IoT environment includes determining an availability level of a network and/or an integrity level of a positioning service and/or system at the wireless device. Based on the availability level of the network and/or the integrity level of the positioning service and/or system at the wireless device, the wireless device performs at least one action associated with the positioning service and/or system.

According to certain embodiments, a wireless device includes processing circuitry configured to determine an availability level of a network and/or an integrity level of a positioning service and/or system at the wireless device. Based on the availability level of the network and/or the integrity level of the positioning service and/or system at the wireless device, the processing circuitry is configured to perform at least one action associated with the positioning service and/or system.

According to certain embodiments, a method by a network node includes receiving, from a wireless device in an I-IoT environment, a first indication of an availability level of a network and/or an integrity level of a positioning service and/or system at the wireless device. Based on the first indication of the availability level of the network and/or the integrity level of the positioning service and/or system at the wireless device, the network node performs at least one action.

According to certain embodiments, a network node includes processing circuitry configured to receive, from a wireless device in an I-IoT environment, a first indication of an availability level of a network and/or an integrity level of a positioning service and/or system at the wireless device. Based on the first indication of the availability level of the network and/or the integrity level of the positioning service and/or system at the wireless device, the processing circuitry performs at least one action.

Certain embodiments may provide one or more of the following technical advantages. For example, one technical advantage may be that certain embodiments provide parameters needed to compute availability and provides network and UE to leverage upon that to ensure high positioning system measures for I-IOT scenario. As another example, a technical advantage may be that certain embodiments provide mechanism for encoding uncertainty using fewer bits. As another example, a technical advantage may be that certain embodiments provide on-demand or dynamic adaptation of Integrity level when UE moves between different zones in a factory or other I-IOT setup. As another example, a technical advantage may be that certain embodiments provide methods to compute positioning availability and reporting it to the network. As still another example, a technical advantage may be that certain embodiments define availability in terms of latency (response time) and coverage. As yet another example, a technical advantage may be that certain embodiments enable hybrid indoor positioning to enhance the positioning service.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 2 illustrates example definitions of accuracy, precision, validity, reliability and integrity;

DETAILED DESCRIPTION

Figure 1:
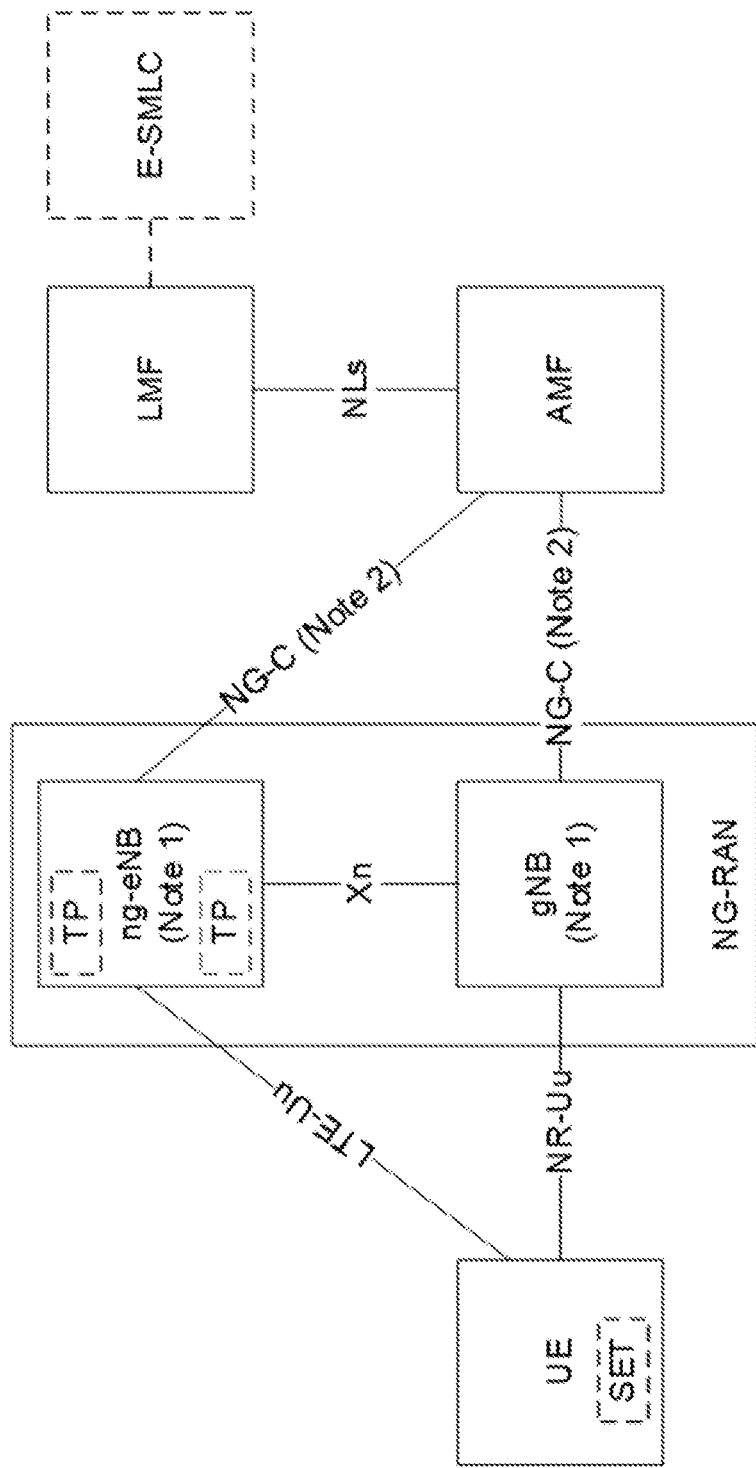
FIG. 1 illustrates NG-RAN Rel-15 Location Services (LCS) Protocols.
Figure 3:
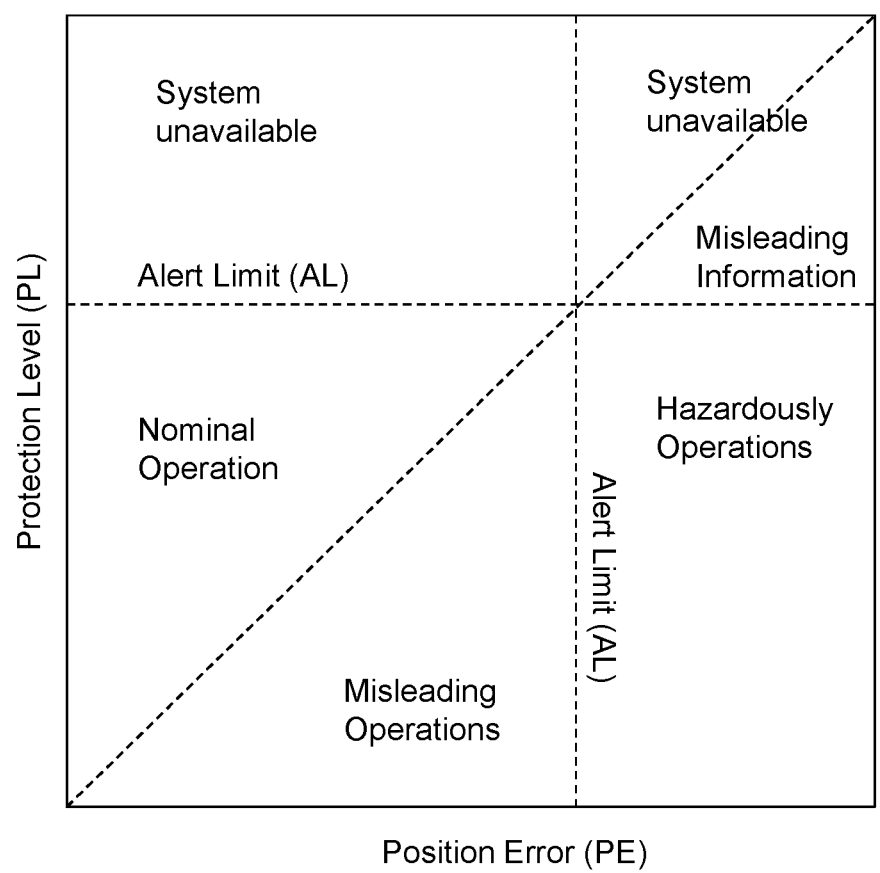
FIG. 3 illustrates an example with the Stanford plot in which all the possible integrity operation and events can be explained in its different regions.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa Other objectives, features and advantages of the enclosed embodiments will be apparent from the following description.

In some embodiments, a more general term "network node" may be used and may correspond to any type of radio network node or any network node, which communicates with a UE (directly or via another node) and/or with another network node. Stated differently, a radio network is any, network node capable of transmitting radio signals. Examples of network nodes are radio network node, NodeB, gNodeB (gNB), next generation eNB (ng-eNB), Master eNB (McNB), a network node belonging to master cell group (MCG) or secondary cell group (SCG), base station (BS), NR base station, Transmission Reception Point (TRP), Multi-Standard Radio (MSR) radio node such as MSR BS, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node (e.g. Mobile Switching Center (MSC), Mobility Management Entity (MME), etc.), Operations & Maintenance (O&M), Operations Support System (OSS), Self Organizing Network (SON), positioning node (e.g. Evolved-Serving Mobile Location Centre (E-SMLC)), Minimization of Drive Test (MDT), test equipment (physical node or software), etc.

In some embodiments, the non-limiting term user equipment (UE) or wireless device may be used and may refer to any type of wireless device communicating with a network node and/or with another UE in a cellular or mobile communication system. Examples of LIE are wireless device capable of supporting NR, target device, device to device (D2D) UE, machine type UE or UE capable of machine to machine (M2M) communication, Personal Digital Assistant (PDA), Tablet, mobile terminals, smart phone, laptop embedded equipped (LEE), laptop mounted equipment (LME), Unified Serial Bus (USB) dongles, UE category M1, UE category M2, Proximity Services UE (ProSe LIE), Vehicle-to-Vehicle UE (V2V UE), Vehicle-to-Anything (V2X UE). Narrowband-Internet of Things (NB-IoT) device, I-IoT device, etc.

Additionally, terminologies such as base station/gNodeB and UE should be considered non-limiting and do in particular not imply a certain hierarchical relation between the two: in general, "gNodeB" could be considered as device 1 and "UE" could be considered as device 2 and these two devices communicate with each other over some radio channel. And in the following the transmitter or receiver could be either gNB, or UE.

Figure 4:
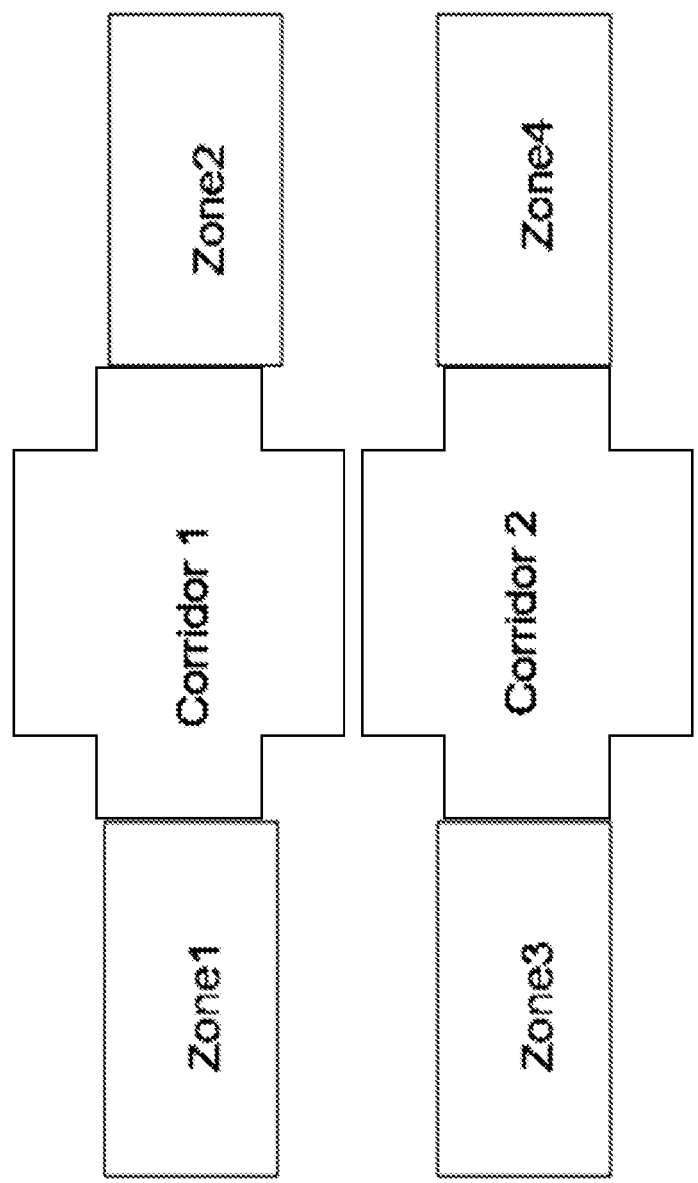
FIG. 4 illustrates an example scenario that includes I-IOT settings for four different zones, according to certain embodiments.

According to certain embodiments, methods and systems are provided for defining on demand aspect of integrity KPI. As an example, I-IOT (factory) may have different settings/zones. FIG. 4 illustrates an example scenario that includes I-IOT settings for four different zones. In the example embodiment of FIG. 4, zone may have unsafe environment compared to zone2. Thus, zone1 may require more tighter constrains than zone2. UEs moving from zone1 to zone2 via a corridor such as corridor1 or corridor2 may have different integrity requirements while moving from zone to the corridor and then to zone2. Thus, the network may vary the integrity level or UE may request on demand, according to certain embodiments.

According to certain embodiments, the UE may also record any unavailability of positioning system and inform to the network. The network may setup different wait and response timer such that UE waits until certain duration before considering the system is unavailable.

According to certain embodiments, methods and systems are provided for a different uncertainty model for I-IOT as the current one defines up to 46 m whereas for I-IOT up to 1 m in many cases may be desired.

In an I-IoT scenario, there are also other different parameters which may contribute to positioning performance and service availability in the whole factory. For example, in the example embodiments described herein, some zone(s) may have one or multiple WiFi or Bluetooth coverage and some zone(s) may lack any of these extra communication services. To achieve a high positioning accuracy, integrity and availability in the I-IoT scenario, it is definitely important to consider the advantage of hybrid indoor positioning into account, meaning that 50+WiFi, 50+BL, and 5G-+WiFi+ Bluetooth. Aside from WiFi, Bluetooth, some of the industrial machines may be equipped with sensors such as Inertial Measurement Unit (MU) sessions or Barometer pressure senor in forklifts, therefore a hybrid 5G+sensor is also an option which may increase the positioning performance in the I-IoT scenario.

Moreover, one of the main contributors in an indoor positioning is the deployment planning of the indoor nodes. Again, considering the assumed different zones in a factory, the number of nodes may be considered Additionally, how the nodes are deployed in a particular zone may identify the level of accuracy, integrity and availability of the positioning service within that zone.

In the I-IoT scenario, it may be that the positioning use-cases are defined within a particular zone and with certain positioning performance requirements, for example a forklift has been defined to move around a particular hall and even within certain paths. However, there are also use-cases that may move within two or more zones in different times of the day or in some other interval. Therefore, the positioning performance in an I-IoT scenario may depend on the zone in which the device is being serviced or also on the use-case and the type of the device which seeks positioning service.

Uncertainty Model

Currently 8-bits are used to denote horizontal accuracy uncertainty.

According to certain embodiments, for I-IOT, only 3-bits may be used to denote horizontal accuracy uncertainty. Embodiments with 3 bits encoding instead of current 8 bits may also save signaling and reduce complexity in LIE does not need to go to mm level when cm level is fine.

According to a particular embodiment, one bit may be used to flag for fine mm resolution. For example, if the UE wants to indicate accuracy within 0 to 100 mm, it can use the same encoding but with a flag (or alternatively another bit in a predefined location of the bitstring) set to indicate that it is in mm level rather than cm level. As another example, the UE may, use a bit to more generally indicating the unit. So, for I-IOT (with 4 bits in total):

UE-Report-Unit=ENUM (mm, cm)

UE-Report-value=BIT STRING SIZE  (3)

In another particular embodiment, two or more reportable bitstrings of a different length are defined, each uniquely associated with the uncertainty model (e.g., level and/or unit, etc.), and the transmitter chooses the one upon the need while the receiver knows the number of bits to receive and thus implicitly gets the indication of which model is used and decodes and uses it accordingly.

In yet another particular embodiment, the uncertainty is a set of two or more bitstrings, e.g., basic-resolution (e.g., in cm) and higher-resolution (e.g., in mm). For example, 1.5 cm would be encoded as 1 cm with the basic resolution bitstring and 5 mm with the higher-resolution bitstring.

Availability Statistics

According to certain embodiments, a TAE may determine the system availability or integrity level and stores this information with a time stamp and/or update the related statistics. The UE may collect such information and the related statistics over time. The information may also be stamped with the network source of the information (e.g., cell X, or TRP X) or the location or area where the UE is residing.

In a particular embodiment, the UE may create and/or maintain one or more records associated different time stamps or derive some statistics (e.g., average over time, number of occasions when the integrity level/availability is below and/or above a threshold and/or occurring after a certain time T0, etc.). The statistics and availability information collection may be triggered, restarted, and/or reported as configured or scheduled by a network node or upon meeting a pre-defined or configured condition. The statistics and availability information collected may be scheduled to be performed over a certain time period and/or a certain time of the day, e.g., pre-defined or configured by a network node.

In a particular embodiment, the UE may then report to a network node the collected information or statistics, in an unsolicited way or upon a request.

In a particular embodiment, the network node may receive such information and/or statistics from one or more UEs, in an unsolicited way or in response to its request. The network node may use this information and/or statistics to determine its availability based on such LIE feedback. The network node may store the determined availability, use it for one or more its operational tasks (e.g., reconfigure one or more of its signal/channel transmissions for positioning based on the statistics, reconfiguring measurement configuration and/or positioning assistance data, increasing/decreasing coverage and/or transmission density in time of its radio signals used for positioning, etc.), and/or signal it to another network node.

Integrity support for UEs in IDLE or INACTIVE

According to certain embodiments, some UEs, as defined above, for example, may operate in IDLE or INACTIVE mode but still require some level of integrity.

According to a particular embodiment, a network node may indicate its integrity level to one, some, or all UEs operating in IDLE or INACTIVE mode. In a particular embodiment, the indication can be intended for UEs of a specific type, capable of a specific feature, performing positioning in IDLE or INACTIVE mode, or needing the integrity information, etc.

In a particular embodiment, the indication may be transmitted be via broadcast or multicast. As one example embodiment, the indication may be provided in system information (e.g., MIB or SIB, in one or more SI blocks).

In a particular embodiment, the indication may also be provided to a specific UE, e.g., when the UE needs to perform positioning in IDLE or INACTIVE mode.

In a particular embodiment, the indication may also occur during paging or tracking area update procedure.

In further particular embodiment, the network node may indicate whether the integrity level has been changed in one specific or in any direction (e.g., decreased or just changed).

In certain embodiments, the network node may be a radio network node, positioning node, a core network node, etc.

In a further particular embodiment, the indication may include the integrity level information associated with the serving/camping radio network node. It may further include the integrity level information associated with other (neighbor) radio network nodes, in a particular embodiment.

The embodiments in this section can also be combined with other embodiments from other sections described herein.

Flexible Integrity Upon the Creed

Figure 5:
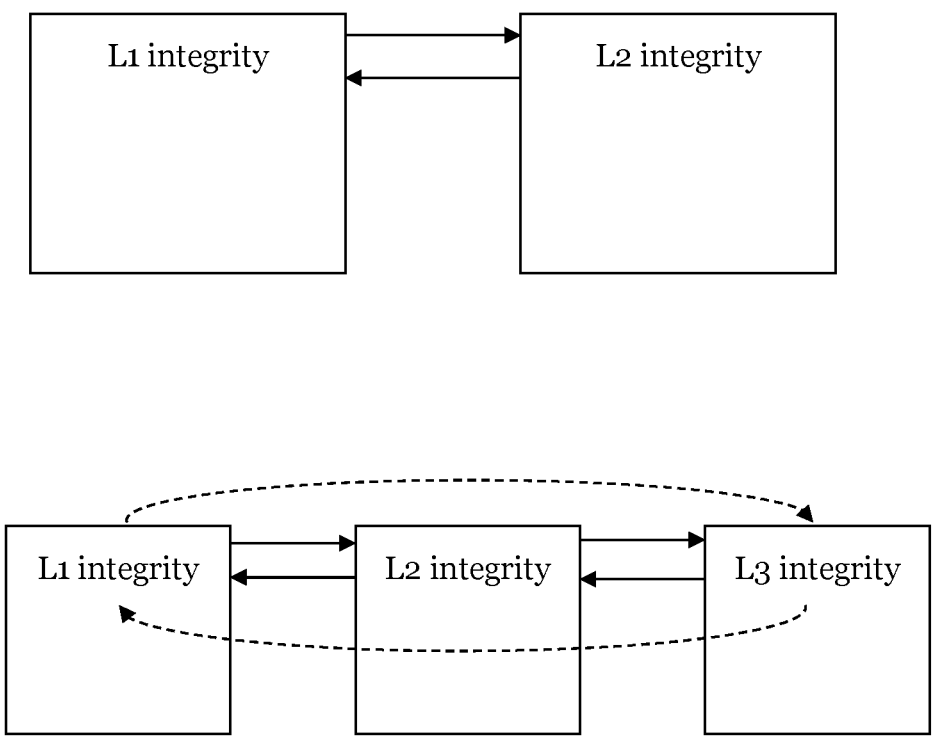
FIG. 5 illustrates multi-level integrity transition models, according to certain embodiments.

It may be expensive to always ensure high integrity everywhere According to certain embodiments, and to save the resources, it is therefore proposed to implement transition steps of the integrity level (e.g., of a network or system in a local area or in a large area). FIG. 5 illustrates multi-level integrity transition models, according to certain embodiments. As depicted in FIG. 5, a high integrity (e.g. level 2, L2) is ensured upon the need or on demand, while a lower integrity level (e.g., level 1, L1) can be provided otherwise. A multi-level integrity transition models can also be envisioned in a similar way (e.g., between L1, L2, and L3, where there may or may not be a direct transition step between L1 and L3).

According to certain embodiments, transition to a higher integrity level (which may be immediate after meeting one or more conditions below or after a time Δ1 during which the condition(s) are met) upon:

An explicit request from at least N UEs (e.g., N=1, . . . )

Determining that the number of UEs which may require a higher (than the current) level of integrity is at least K (e.g., K=1 . . . ), which may be determined when one or more such UEs are activated, getting connected, moving into the area associated with the integrity level in question, etc.

An event (e.g., related to radio network operation or non-radio such as a fire, car accident, an emergency case, etc.) occurring in the area Scheduling (e.g., start during a certain day and/or time of the day)

According to certain embodiments, transition to a lower integrity level (which may be immediate after meeting one or more conditions below or after a time Δ2 during which the condition(s) are met) upon:

Determining that the number of UEs which may require a higher (than the current) level of integrity is <K, which may be determined when one or more such UEs are disconnected or deactivated, moving out of the area associated with the integrity level in question, etc.

Determining or receiving an indication that an event (e.g., related to radio network operation or non-radio such as a fire, car accident, an emergency case, etc.) occurring in the area has been resolved Scheduling (e.g., stop during a certain day and/or time of the day)

According to certain embodiments, the network may periodically indicate its integrity level, e.g., based on the embodiments in previous sections and/or by other means. In another example, the network may indicate its new integrity level after the transition, e.g., based on the embodiments in previous sections and/or by other means.

According to certain embodiments, the node determining the network integrity level by itself or receiving the integrity level information (e.g., the UE as described above) uses this information in its positioning operation.

Response/Wait Timers

According to certain embodiments, and in order to ensure positioning system availability, a response timer may be configured by network which setups the expected time within which the network will response to the UE after LIE has requested for positioning assistance information or provided positioning measurement in lieu of obtaining its position from the network. In a particular embodiment, the timers may be configured in LTE Positioning Protocol (LPP) level Until that time, UE presumes that the network is working, and the positioning system is available. According to various embodiments, the timers can be either pre-configured set in system broadcast or may be provided unicast via LPP to the UE. According to a particular embodiment, the timer may also be configured such as by taking into account the Network Access Stratum (NAS) timer, Next Generation Application Protocol (NGAP) timer and Radio Resource Control (RRC) timers, such that timer could be summation of NAS+RRC+NGAP timer or basically derived using the function of NGAP, NAS and RRC timers.

As this timer information is needed prior to the positioning assistance data signaling from the network to the UE, this information may be provided to the UE from one the following ways:

To provide it at the time of capability request signaling in the unicast

Preconfigured at the LIE based on the use-case and as the I-IoT is a controlled area, the expectations from the network can be given to the TAE as a setting format To provide it in the broadcast and separate from the assistance information broadcast, so that the UE does not require to get the whole positioning SIB to check for this timer information.

The performance and latency of the network may differ in different zones of the I-IoT scenario, and hence depending on the zone and the tinier information, the UE may request for certain positioning method or integrity level for the positioning service, according to certain embodiments.

Positioning Coverage Availability

For coverage in terms of positioning, both the positioning coverage and communication coverage needs to be considered Since, positioning message are transported via communication system, the device should have good communication coverage. Besides, the device should be able to hear distant Positioning Reference Signal to be able to perform positioning giving better results (GDOP) and further Line of Sight (LOS) is desirable. Hence, according to certain embodiments, it is desirable for the UE to compute what coverage it has in terms of both radio communication and in terms of positioning and reports to the network.

Accordingly, certain embodiments propose to define a new coverage metric such that it is combined function of serving cell RSRP and distant neighbor DL PRS RSRP.

Positioning coverage=func(CSI-RS/SSB serving cell RSRP measurement & DL-PRS RSRP from distant neighbor cell/TRP)

In the I-IoT scenario, as it is a controlled area, it is very likely that a fingerprinting technique would be considered to investigate the coverage availability of every square area of the whole factory. This means that depending on the positioning accuracy level which is required for the machines such as forklifts, the area would be divided into small squares and there can be predefined check in the factory on the availability of both coverage and positioning service for each square. With this analysis, it is also possible to easily understand how and where the radio nodes need to be added to fix any coverage problem. One should not forget that the in the I-IoT scenario, we are also interested to have vertical positioning as well, and hence the fingerprinting would not be only in the x-y axis, but it may should consider the volume of the whole factory as well. The coverage may be represented with the following formats:

One value to represent the aggregated quality level of the communication and the positioning service Two values, one representing the communication coverage and one represent the positioning service coverage Only one value representing the positioning service coverage with the assumption that perfect communication coverage is provided.

Enabling hybrid positioning to enhance positioning service in I-IoT scenario

In an I-IoT scenario, the positioning service is provided for a controlled area which very likely is equipped with few WiFi and Bluetooth access coverage and mane of the machines which are required to perform positioning are equipped with different sensors. For outdoor positioning, the hybrid 5G+GNSS would enhance the positioning performance in terms of accuracy, integrity and also availability of the positioning service. According to certain embodiments, the same concept may be considered for the indoor positioning performance with the presence of WiFi, Bluetooth and different inertial measurement units and barometric pressure sensors.

Due to the nature of this scenario, all the devices and UEs within this scenario are cooperating to perform in the best way possible. Also, the WiFi and Bluetooth access points are already secured and private for the certain factory. Therefore, it is logical to consider that the UEs may report the WiFi, Bluetooth and sensors information to the network in a less optional and more mandatory fashion, and that the network would have an accurate information of for example the identity and exact location of these access points for further enhancing the accuracy, integrity and availability of the indoor positioning service in the I-IoT scenario.

Figure 6:
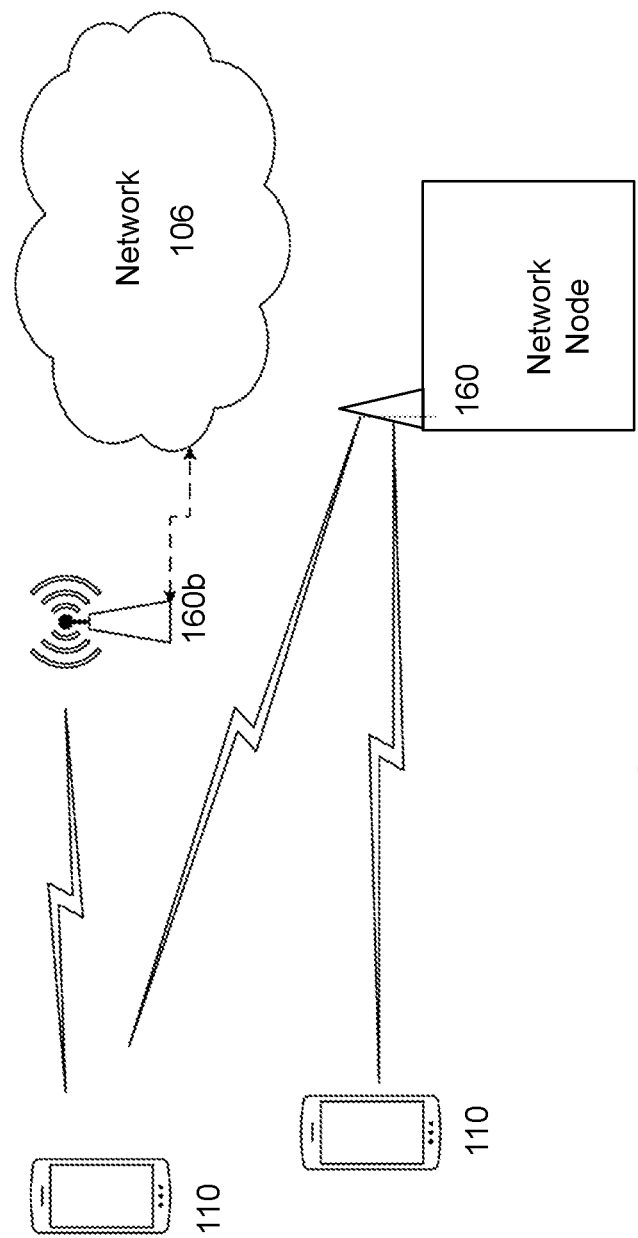
FIG. 6 illustrates an example wireless network, according to certain embodiments.

FIG. 6 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 106, network nodes 160 and 160b, and wireless devices 110. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 7:
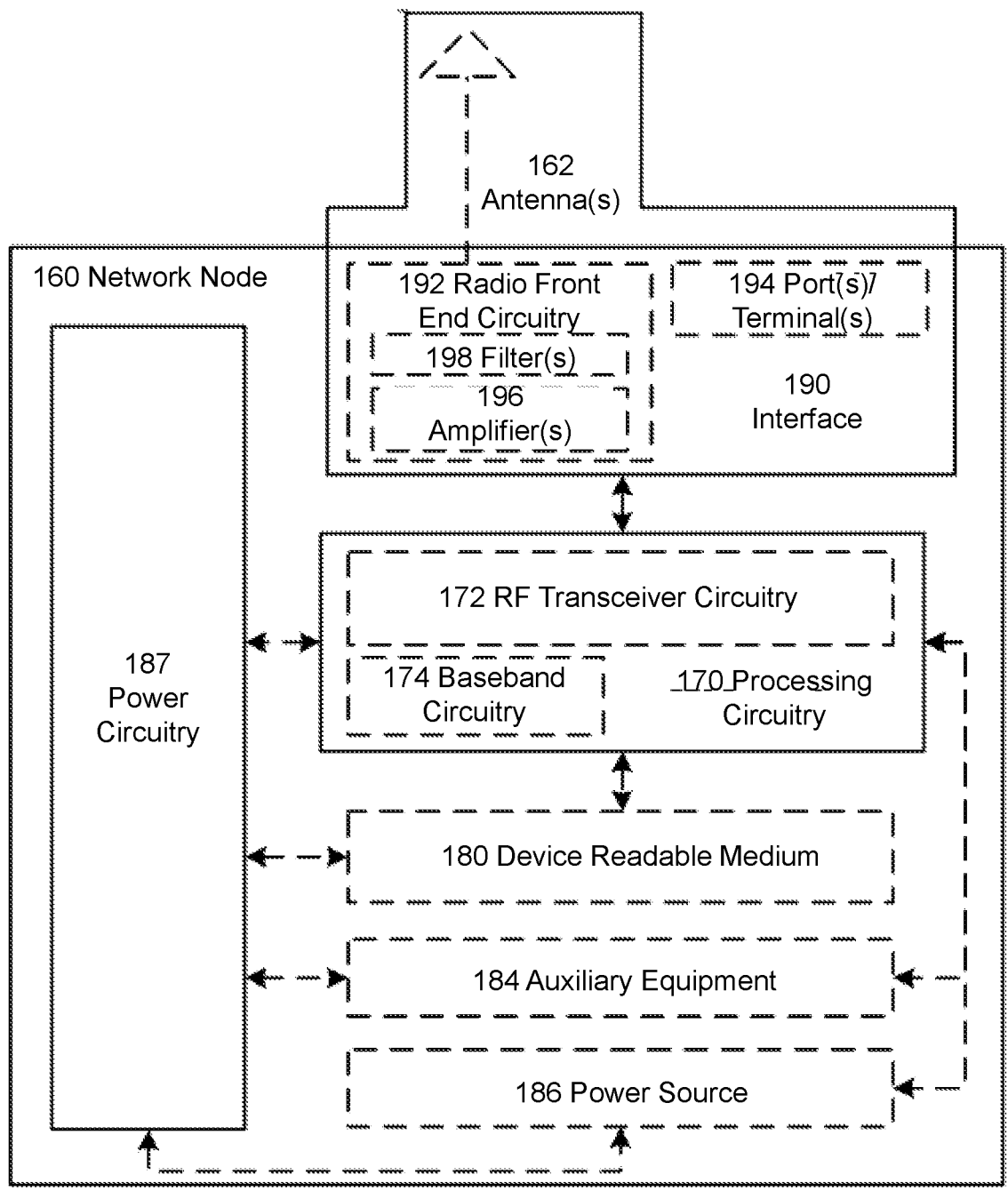
FIG. 7 illustrates an example network node, according to certain embodiments.

FIG. 7 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 160 includes processing circuitry 170, device readable medium 180, interface 190, auxiliary equipment 184, power source 186, power circuitry 187, and antenna 162. Although network node 160 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATS). In such embodiments, some components may be duplicated (e.g., separate device readable medium 180 for the different RATs, and some components may be reused (e.g., the same antenna 162 may, be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality, may include providing any of the various wireless features, functions, or benefits discussed herein In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may, be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply, the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may, be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 7 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 8:
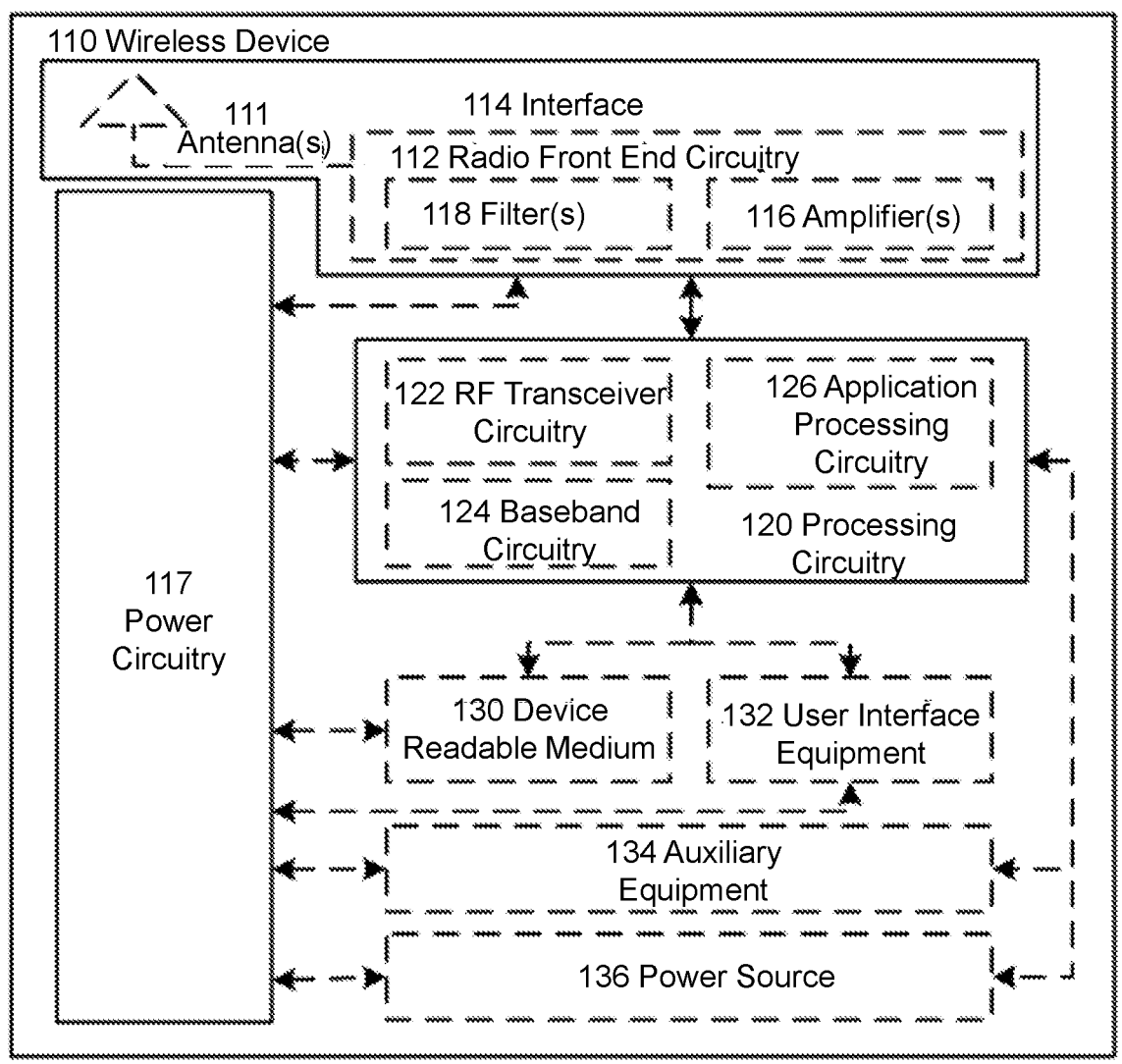
FIG. 8 illustrates an example wireless device, according to certain embodiments.

FIG. 8 illustrates an example wireless device 110. According to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device a wireless customer-premise equipment (CPE), a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134 power source 136 and power circuitry 137. Wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, wireless device 110 may not include separate radio front end circuitry 112, rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or pow er cells, may also be used, wireless device 110 may further comprise power circuitry 137 for delivering power from power source 136 to the various parts of wireless device 110 which need power from power source 136 to cane out any functionality described or indicated herein. Power circuitry 137 may in certain embodiments comprise power management circuitry. Power circuitry 137 may additionally or alternatively be operable to receive power from an external power source, in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 9:
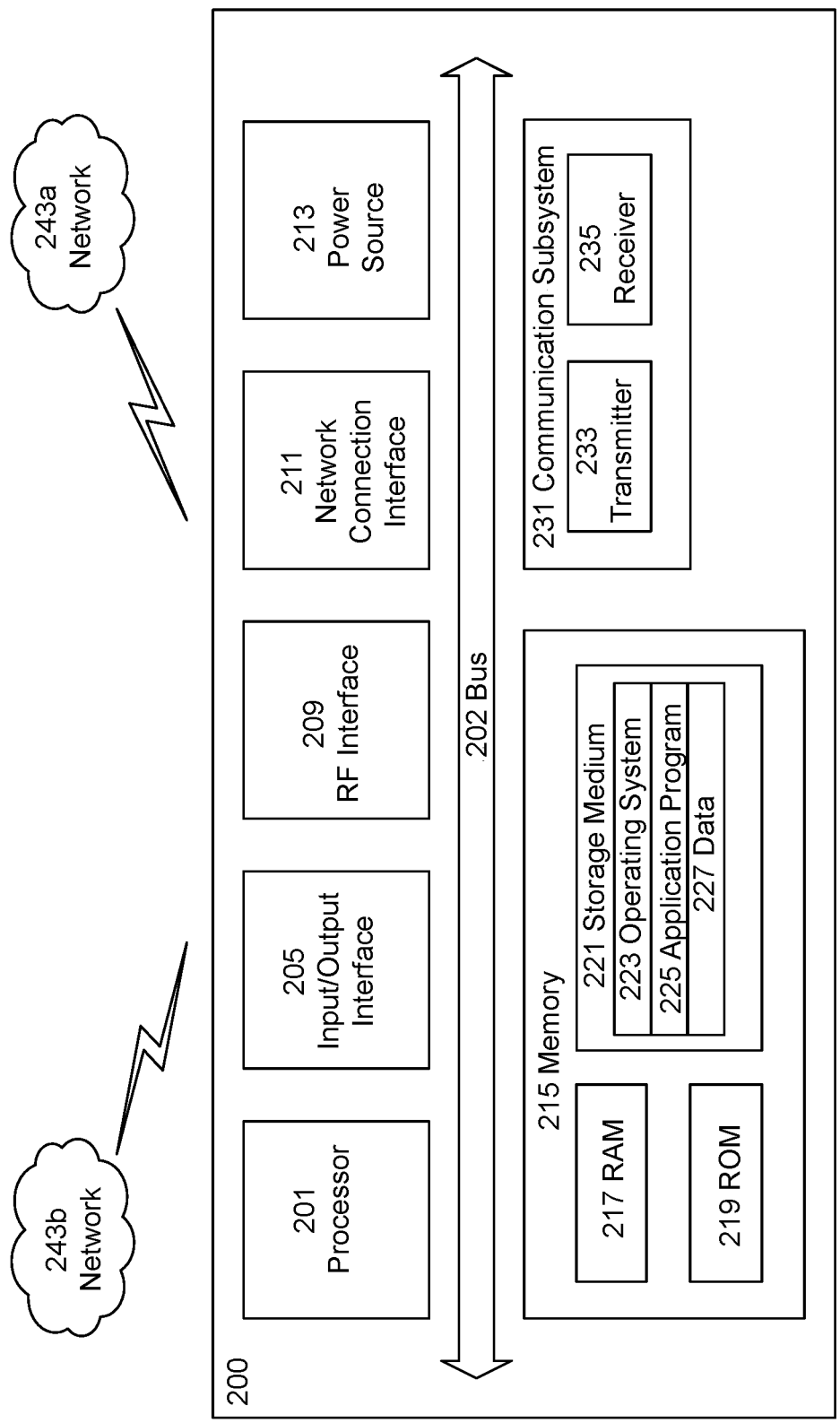
FIG. 9 illustrate an example user equipment, according to certain embodiments.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 7, is one example of a wireless device configured for communication in accordance with one or more communication standards promulgated by the $3^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 9 is a UE, the components discussed herein are equally applicable to a wireless device, and vice-versa.

In FIG. 9, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.), programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 209 may be configured to provide a communication interface to RF components such as a transmitter, a receiver, and an antenna Network connection interface 211 may be configured to provide a communication interface to network 243a. Network 243a may encompass wired and/or wireless networks such as a local-area network (LAN), a wide-area network (WAN), a computer network a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet. TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory. USB flash drive, external hard disk drive, thumb drive, pen drive, key drive, high-density digital versatile disc (HD-DVD) optical disc drive, internal hard disk drive. Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 121 may allow UE 200 to access computer-executable instructions, application programs or the like, stored on transitory or non-transitory memory media, to off load data, or to upload data. An article of manufacture, such as one utilizing a communication system may be tangibly embodied in storage medium 221, which may comprise a device readable medium.

In FIG. 9, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication. Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 20t) or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 10:
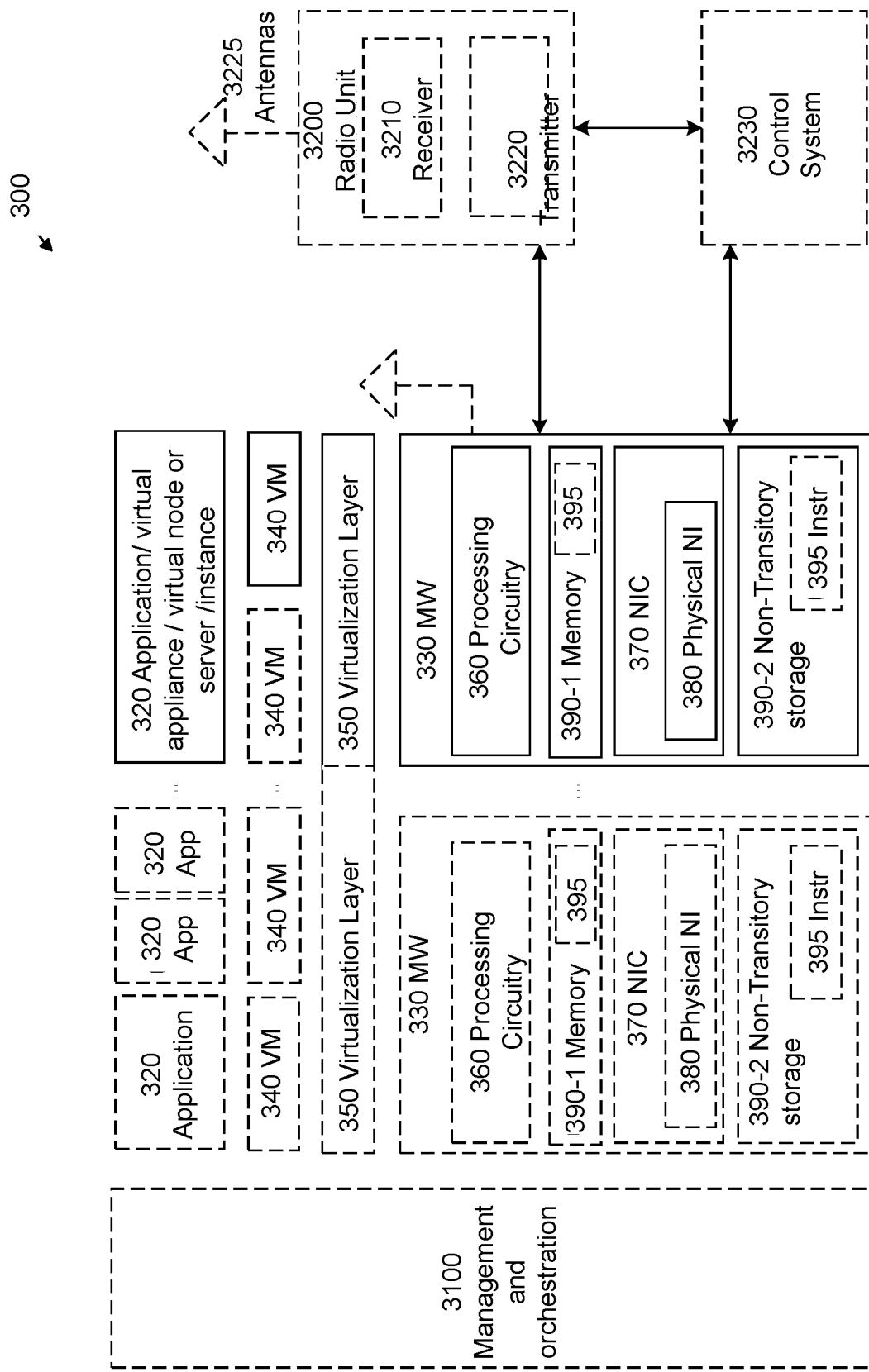
FIG. 10 illustrates a virtualization environment in which functions implemented by some embodiments may be virtualized, according to certain embodiments.

FIG. 10 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization laser 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 10, hardware 330 may be a standalone network node with generic or specific components. Hardware 330 may comprise antenna 3225 and may implement some functions via virtualization. Alternatively, hardware 330 may be part of a larger cluster of hardware (e.g., such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV. Virtual Network Function (VNF) is responsible for handling specific network functions that run in one or more virtual machines 340 on top of hardware networking infrastructure 330 and corresponds to application 320 in FIG. 10.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be affected with the use of control system 3230 which may alternatively be used for communication between the hardware nodes 330 and radio units 3200.

Figure 11:
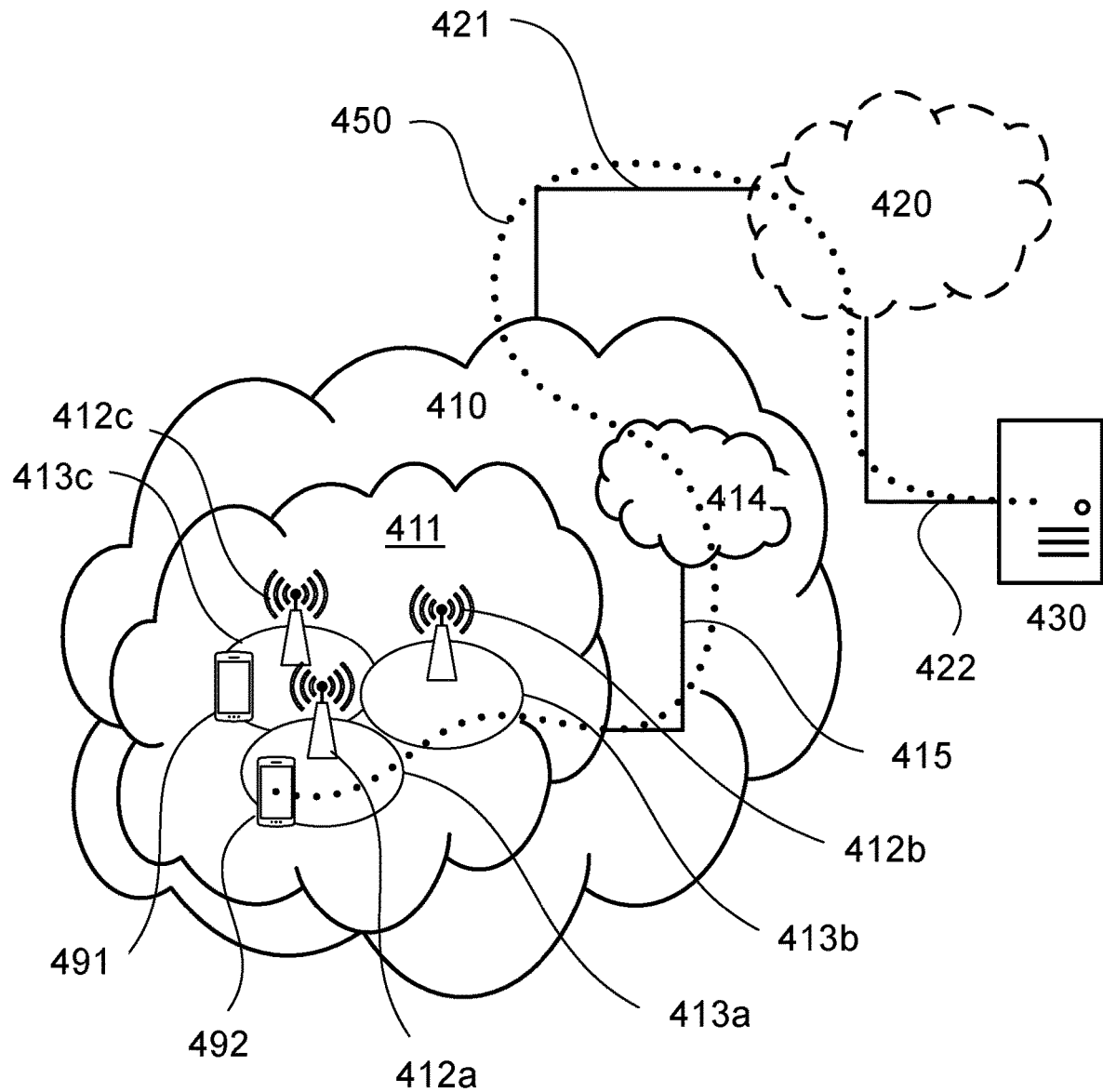
FIG. 11 illustrates a telecommunication network connected via an intermediate network to a host computer, according to certain embodiments.

FIG. 11 illustrates a telecommunication network connected via an intermediate network to a host computer in accordance with some embodiments. With reference to FIG. 11, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is s wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may, extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 11 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over to a connected UE 491. Similarly, base station 412 need not be aware of the future routing of an outgoing uplink communication originating from the UE 491 towards the host computer 430.

Figure 12:
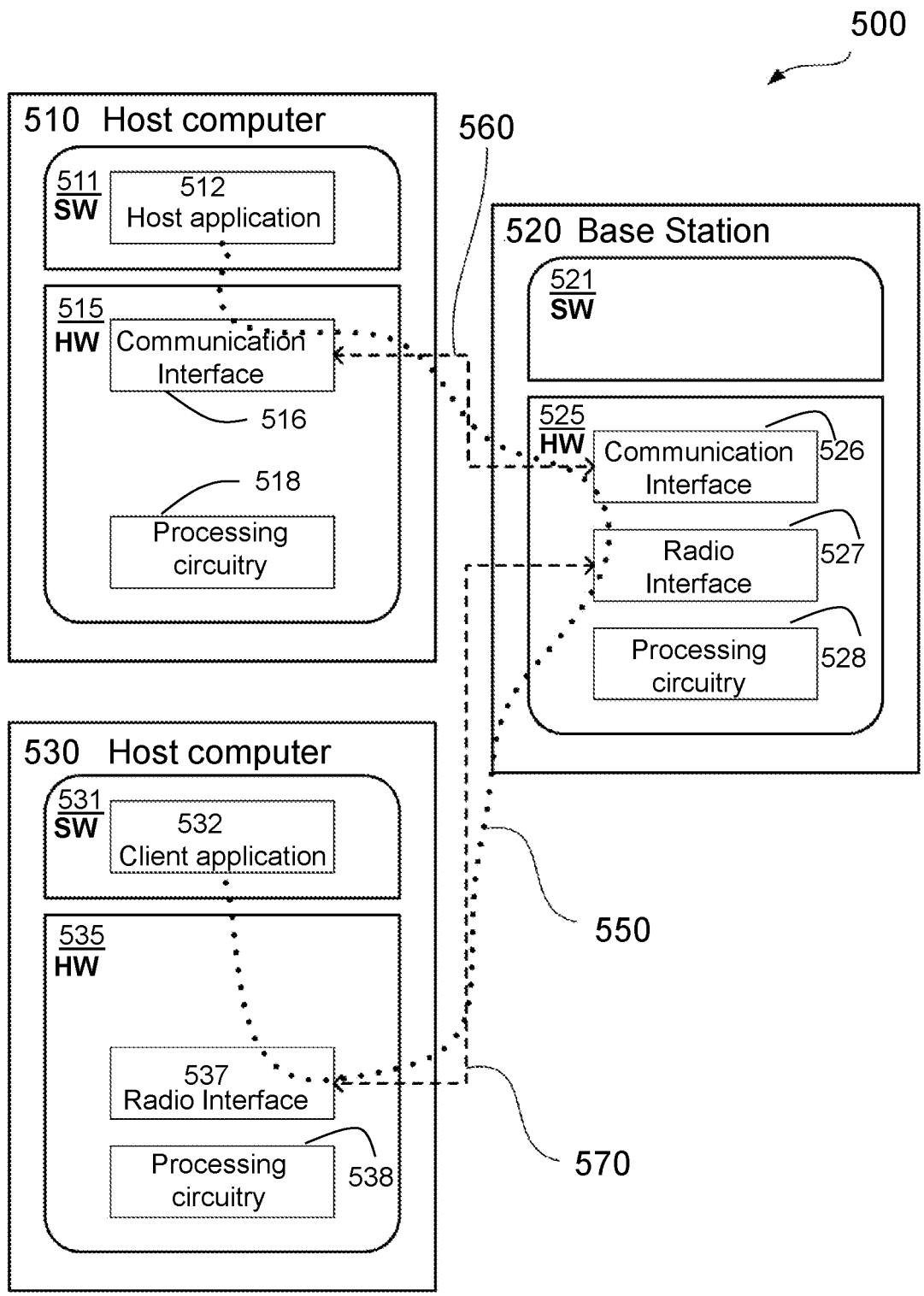
FIG. 12 illustrates a generalized block diagram of a host computer communicating via a base station with a user equipment over a partially wireless connection, according to certain embodiments.

FIG. 12 illustrates a host computer communicating via a base station with a user equipment over a partially wireless connection in accordance with some embodiments. Example implementations, in accordance with an embodiment, of the UE, base station and host computer discussed in the preceding paragraphs will now be described with reference to FIG. 12. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 12) served by base station 520. Communication interface 526 may be configured to facilitate connection 560 to host computer 510. Connection 560 may be direct or it may pass through a core network (not shown in FIG. 12) of the telecommunication system and/or through one or more intermediate networks outside the telecommunication system In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at LIE 530 and host computer 510. In providing the service to the user, client application 532 may receive request data from host application 512 and provide user data in response to the request data. OTT connection 550 may, transfer both the request data and the user data. Client application 532 may interact with the user to generate the user data that it provides.

It is noted that host computer 510, base station 520 and UE 530 illustrated in FIG. 12 may be similar or identical to host computer 430, one of base stations 412a, 412b, 412c and one of UEs 491, 492 of FIG. 11, respectively. This is to say, the inner workings of these entities may be as shown in FIG. 12 and independently, the surrounding network topology may be that of FIG. 11.

In FIG. 12, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to LIE 530 using OTT connection 550, in which wireless connection 570 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 13, 14:
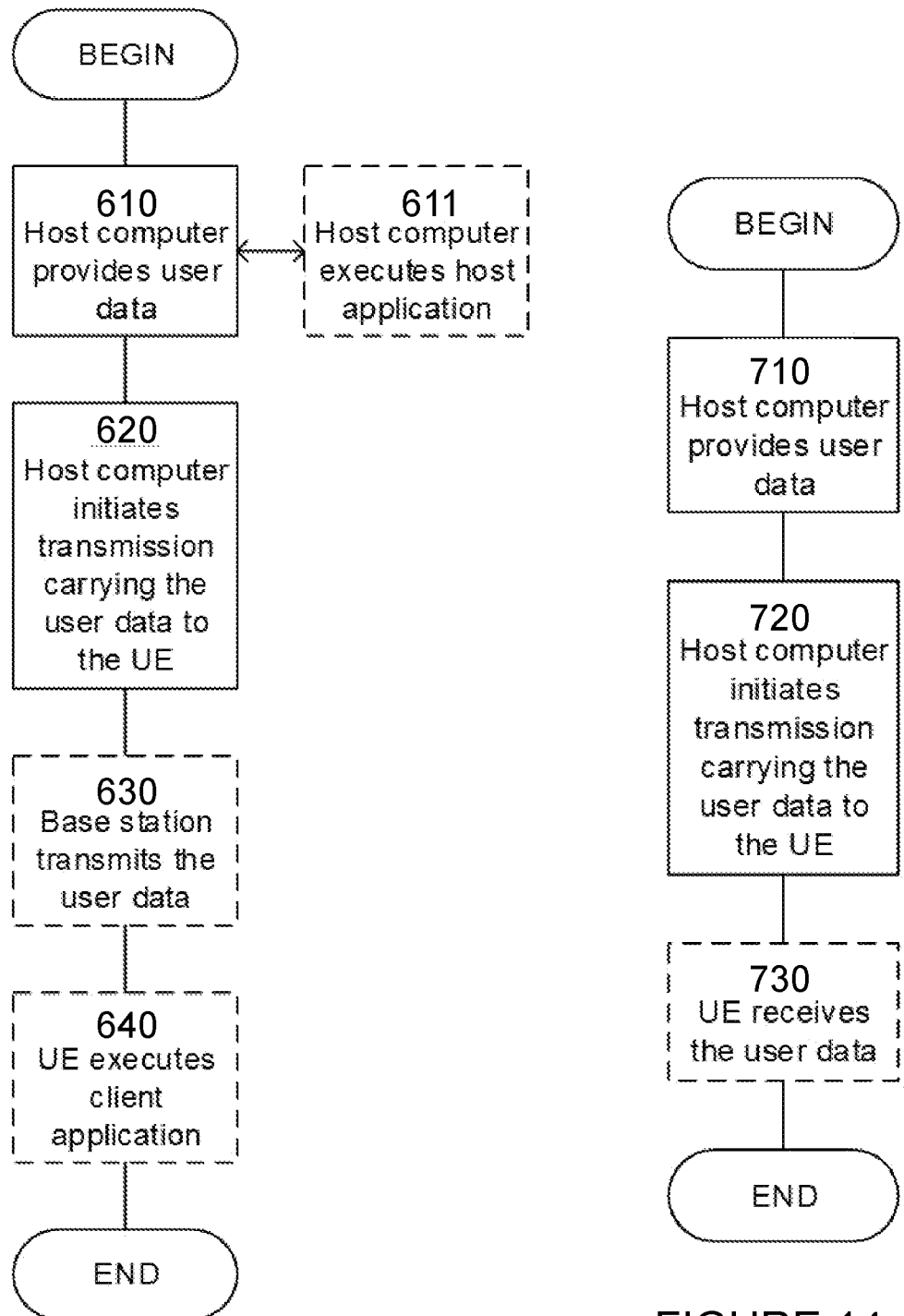
FIG. 13 illustrates a method implemented in a communication system, according to one embodiment.
FIG. 14 illustrates another method implemented in a communication system, according to one embodiment.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may, be optional), the UE receives the user data carried in the transmission.

Figure 15:
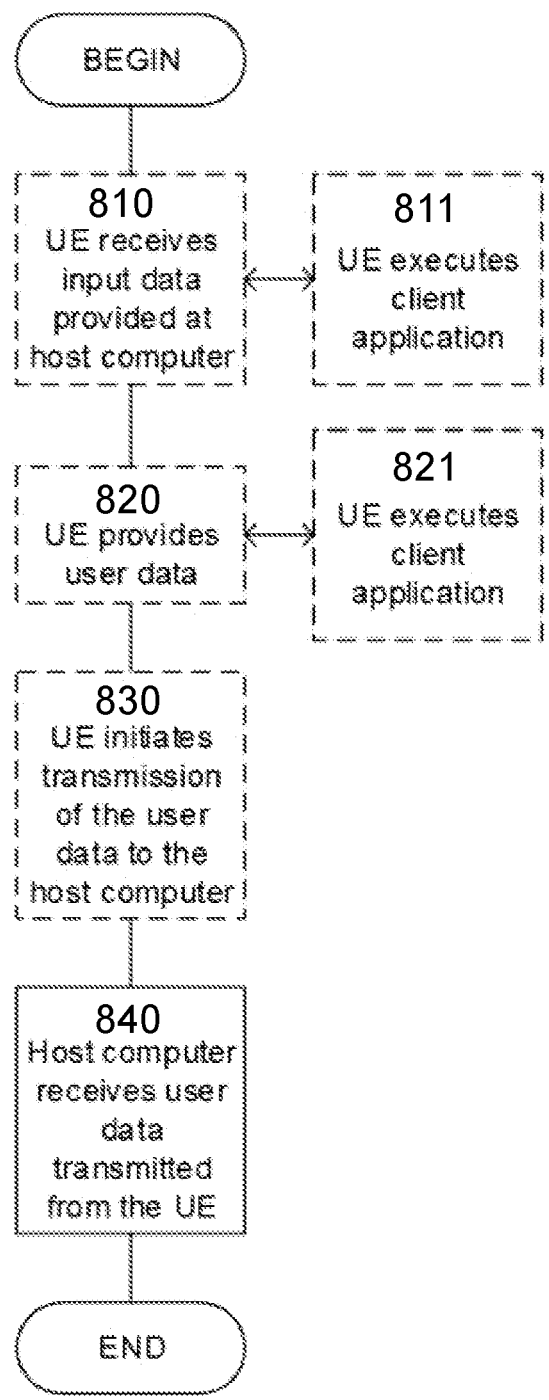
FIG. 15 illustrates another method implemented in a communication system, according to one embodiment.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section In step 810 (which may be optional), the UE receives input data provided by the host computer. Additionally or alternatively, in step 820, the UE provides user data. In substep 821 (which may be optional) of step 820, the TAE provides the user data by executing a client application. In substep 811 (which may be optional) of step 810, the UE executes a client application which provides the user data in reaction to the received input data provided by the host computer. In providing the user data, the executed client application may further consider user input received from the user Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 16:
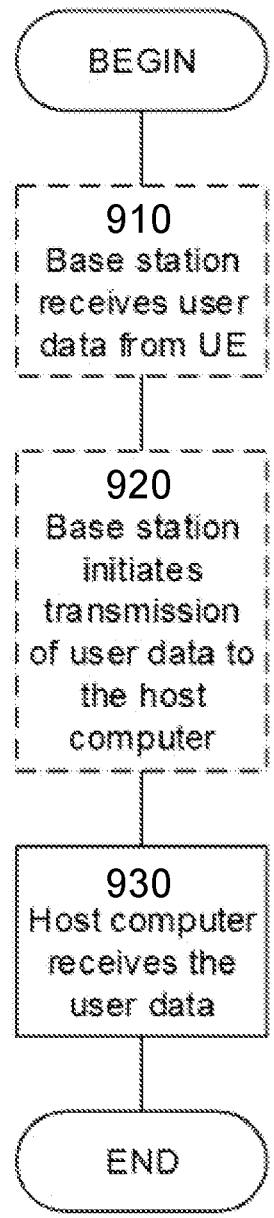
FIG. 16 illustrates another method implemented in a communication system, according to one embodiment.

FIG. 16 is a flowchart illustrating a method implemented in a communication system, in accordance with one embodiment. The communication system includes a host computer, a base station and a LIE which may be those described with reference to FIGS. 10 and 11. For simplicity of the present disclosure, only drawing references to FIG. 16 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Figure 17:
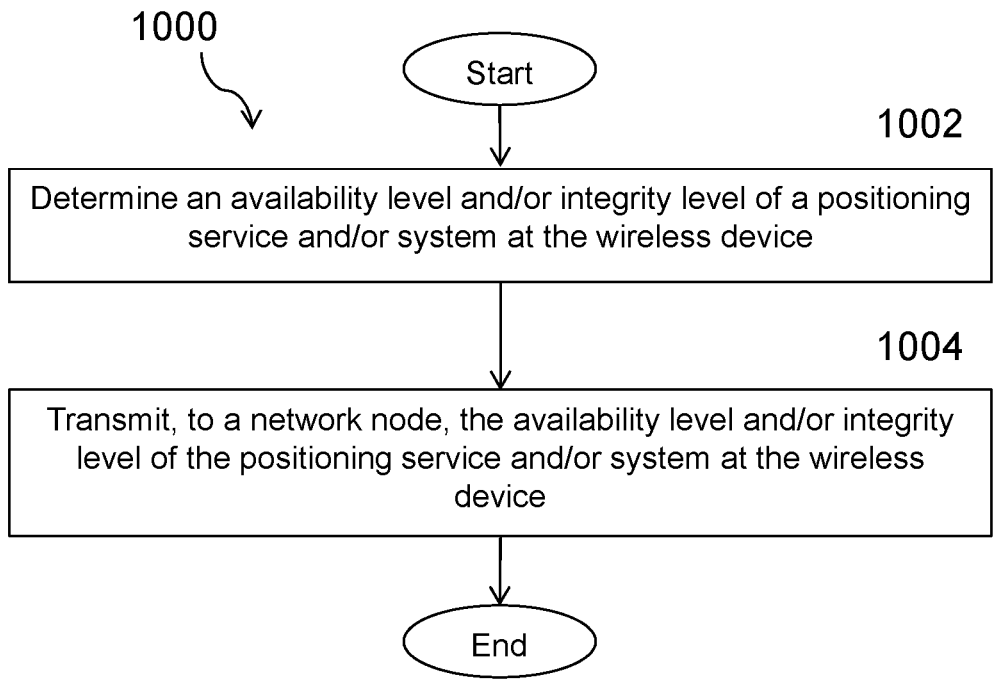
FIG. 17 illustrates an example method by a wireless device, according to certain embodiments.

FIG. 17 depicts a method 1000 by a wireless device 110 in an IoT environment or IoT network, according to certain embodiments. At step 1002, the wireless device 110 determines an availability level and/or integrity level of a positioning service and/or system at the wireless device. At step 1004, the wireless device 110 transmits, to a network node 160, the availability level and/or integrity level of the positioning service and/or system at the wireless device 110.

Figure 18:
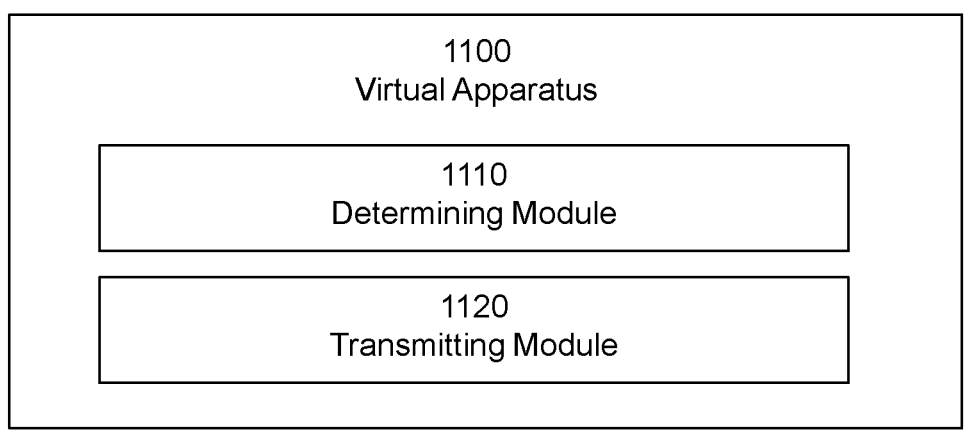
FIG. 18 illustrates an example virtual apparatus, according to certain embodiments.

FIG. 18 illustrates a schematic block diagram of a virtual apparatus 1100 in a wireless network (for example, the wireless network shown in FIG. 6). The apparatus may be implemented in a wireless device or network node (e.g., wireless device 110 or network node 160 shown in FIG. 6). Apparatus 1100 is operable to can out the example method described with reference to FIG. 17 and possibly any other processes or methods disclosed herein. It is also to be understood that the method of FIG. 17 is not necessarily carried out solely, by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may, include one or several types of memory such as read-only memory (ROM), random-access memory, cache memory, flash memory devices, optical storage de-ices, etc. Program code stored in memory includes program instructions for executing one or more telecommunications and/or data communications protocols as well as instructions for carrying out one or more of the techniques described herein, in several embodiments. In some implementations, the processing circuitry may be used to cause determining module 1110, transmitting module 1120, and any other suitable units of apparatus 1100 to perform corresponding functions according one or more embodiments of the present disclosure.

According to certain embodiments, determining module 1110 may perform certain of the determining functions of the apparatus 1100. For example, determining module 1110 may determine an availability level and/or integrity level of a positioning service and/or system at the wireless device.

According to certain embodiments, transmitting module 1120 may perform certain of the transmitting functions of the apparatus 1100. For example, transmitting module 1120 may transmit to a network node, the availability level and/or integrity level of the positioning service and/or system at the wireless device.

As used herein, the term module may have conventional meaning in the field of electronics, electrical devices and/or electronic devices and may include, for example, electrical and/or electronic circuitry, devices, units, processors, memories, logic solid state and/or discrete devices, computer programs or instructions for carrying out respective tasks, procedures, computations, outputs, and/or displaying functions, and so on, as such as those that are described herein.

Figure 19:
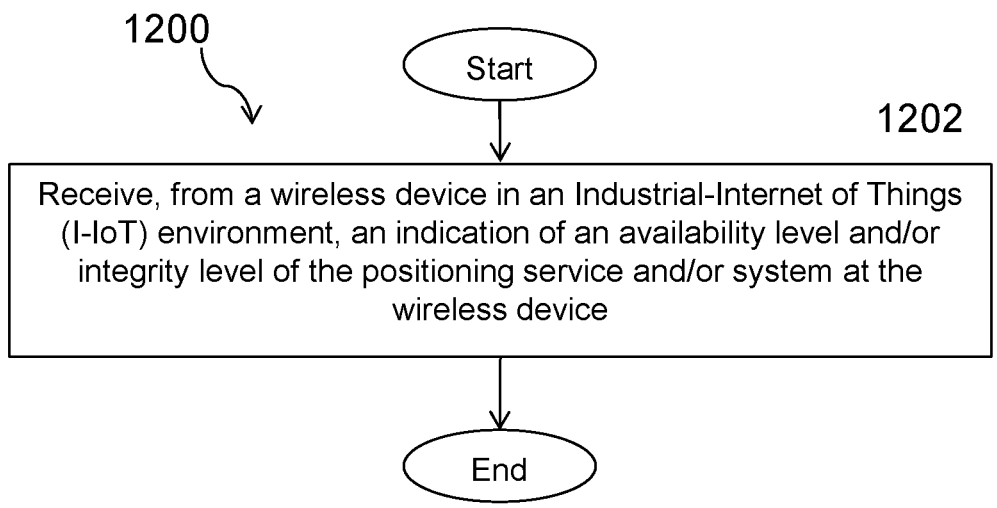
FIG. 19 illustrates an example method by a network node, according to certain embodiments.

FIG. 19 depicts a method 1200 by a network node 160, according to certain embodiments. At step 1202, the network node 160 receive, from a wireless device 110 in an Internet of Things (IoII environment, an indication of an availability level and/or integrity level of the positioning service and/or system at the wireless device 110.

Figure 20:
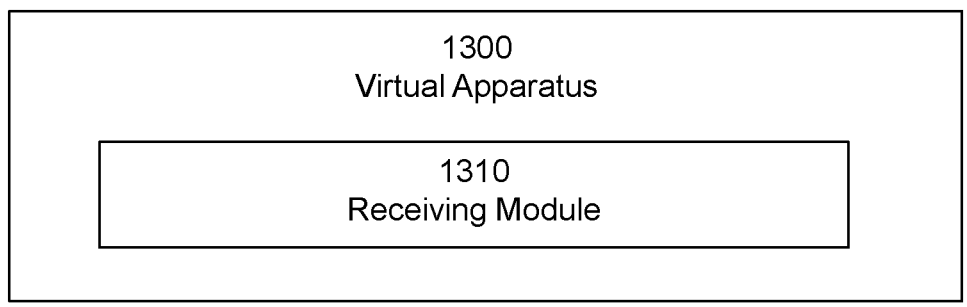
FIG. 20 illustrates another example virtual apparatus, according to certain embodiments.

FIG. 20 illustrates a schematic block diagram of a virtual apparatus 1300 in a wireless network (for example, the wireless network shown in FIG. 6) The apparatus may be implemented in a wireless device or network node (e.g., wireless device 110 or network node 160 shown in FIG. 6) Apparatus 1300 is operable to carry out the example method described with reference to FIG. 19 and possibly any other processes or methods disclosed herein. It is also to be understood that the method of FIG. 19 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 1310 and any other suitable units of apparatus 1300 to perform corresponding functions according one or more embodiments of the present disclosure.

According to certain embodiments, receiving module 1310 may perform certain of the receiving functions of the apparatus 1300. For example, receiving module 1310 may receive, from a wireless device in an Internet of Things (IoT) environment, an indication of an availability level and/or integrity level of the positioning service and/or system at the w ireless device.

Figure 21:
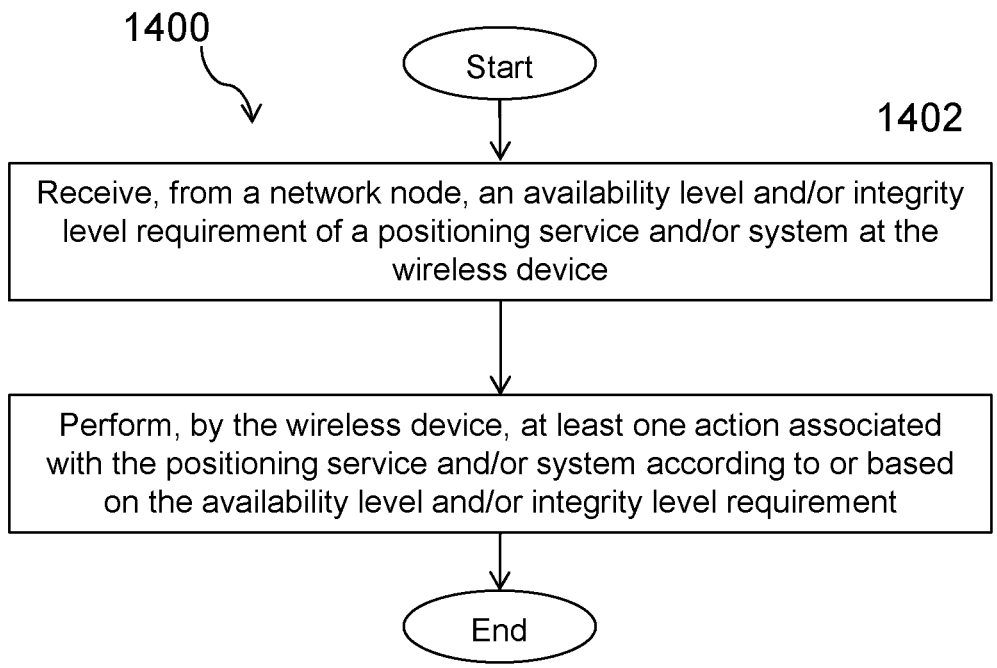
FIG. 21 illustrates another example method by a wireless device, according to certain embodiments.

FIG. 21 depicts another method 1400 by a wireless device 110 in an IoT environment or network, according to certain embodiments. At step 1402, the wireless device 110 receives, from a network node 160, an availability level and/or integrity level requirement of a positioning service and/or system at the wireless device 110. At step 1404, the wireless device 110 performs at least one action associated with the positioning service and/or system according to or based on the availability level and/or integrity level requirement.

Figure 22:
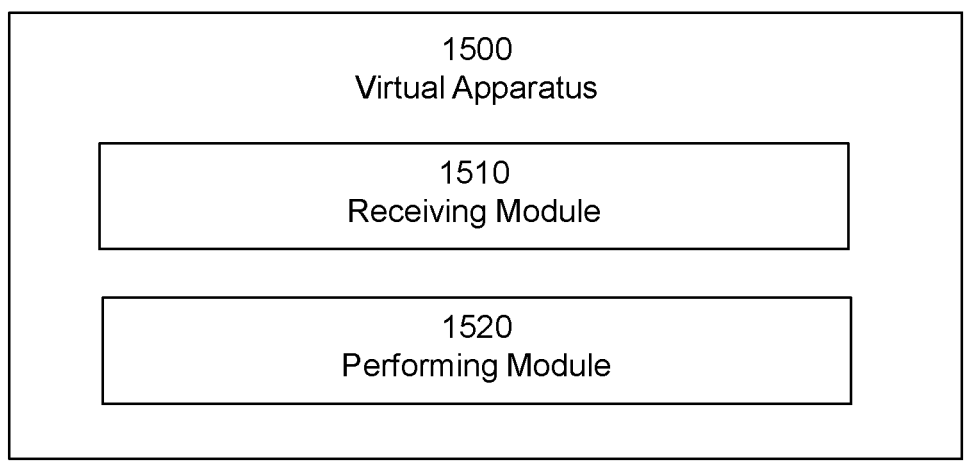
FIG. 22 illustrates another example virtual apparatus, according to certain embodiments.

FIG. 22 illustrates a schematic block diagram of a virtual apparatus 1500 in a wireless network (for example, the wireless network shown in FIG. 6) The apparatus may be implemented in a wireless device or network node (e.g., wireless device 110 or network node 160 shown in FIG. 6) Apparatus 1500 is operable to carry out the example method described with reference to FIG. 21 and possibly any other processes or methods disclosed herein. It is also to be understood that the method of FIG. 21 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage deices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 1510, performing module 1520, and any other suitable units of apparatus 1500 to perform corresponding functions according one or more embodiments of the present disclosure.

According to certain embodiments, receiving module 1510 may perform certain of the receiving functions of the apparatus 1500. For example, receiving module 1510 may receive, from a network node, an availability level and/or integrity level requirement of a positioning service and/or system at the wireless device.

According to certain embodiments, performing module 1520 may perform certain of the performing functions of the apparatus 1500. For example, performing module 1520 may perform, by the wireless device, at least one action associated with the positioning service and/or system according to or based on the availability level and/or integrity level requirement.

Figure 23:
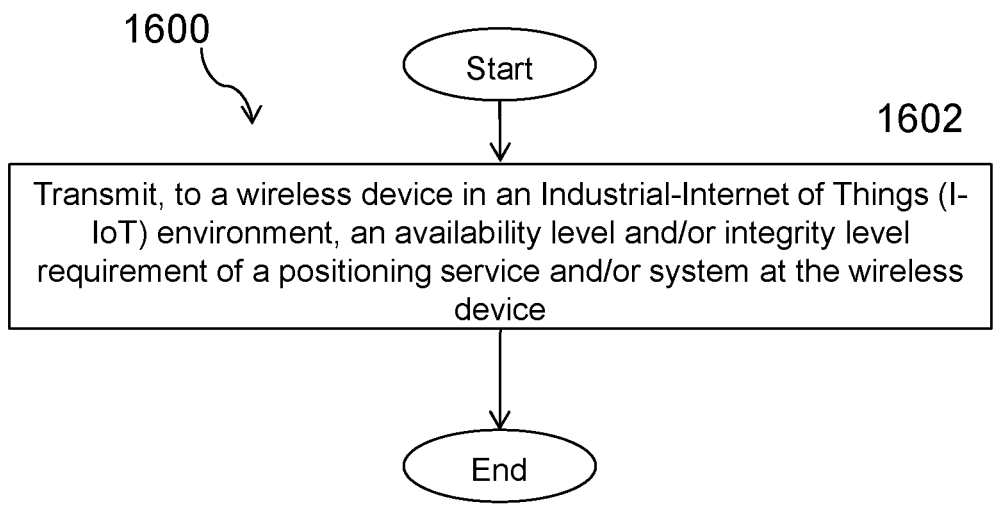
FIG. 23 illustrates another example method by a network node, according to certain embodiments.

FIG. 23 depicts another method 1600 by a network node 160, according to certain embodiments. At step 1602, the network node 160 transmits, to a wireless device 110 in an Internet of Things (IoT) environment, an availability level and/or integrity level requirement of a positioning service and/or system at the wireless device 110.

Figure 24:
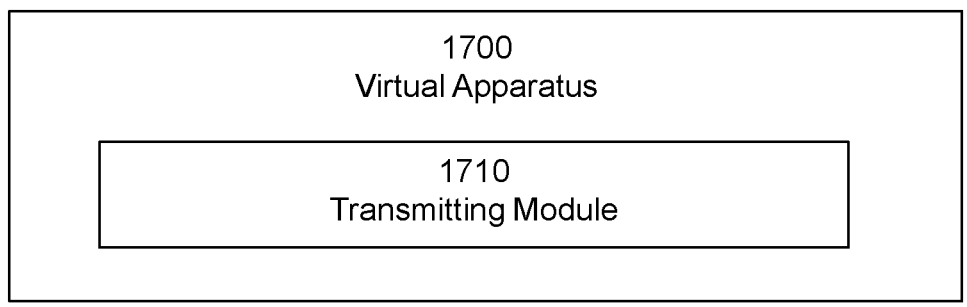
FIG. 24 illustrates another example virtual apparatus, according to certain embodiments.

FIG. 24 illustrates a schematic block diagram of a virtual apparatus 1700 in a wireless network (for example, the wireless network shown in FIG. 6). The apparatus may be implemented in a wireless device or network node (e.g., wireless device 110 or network node 160 shown in FIG. 6). Apparatus 1700 is operable to carry out the example method described with reference to FIG. 23 and possibly any other processes or methods disclosed herein. It is also to be understood that the method of FIG. 23 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (USPs)), special-purpose digital logic, and the like. The processing circuitry may be configured to execute program code stored in memory, which may include one or several types of memory such as read-only memory (ROM), random-access memory, cache memory, hash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting module 1710 and any other suitable units of apparatus 1700 to perform corresponding functions according one or more embodiments of the present disclosure.

According to certain embodiments, transmitting module 1710 may perform certain of the transmitting functions of the apparatus 1700. For example, transmitting module 1710 may transmit, to a wireless device in an Internet of Things (IoT) environment, an availability level and/or integrity level requirement of a positioning service and/or system at the wireless device.

Figure 25:
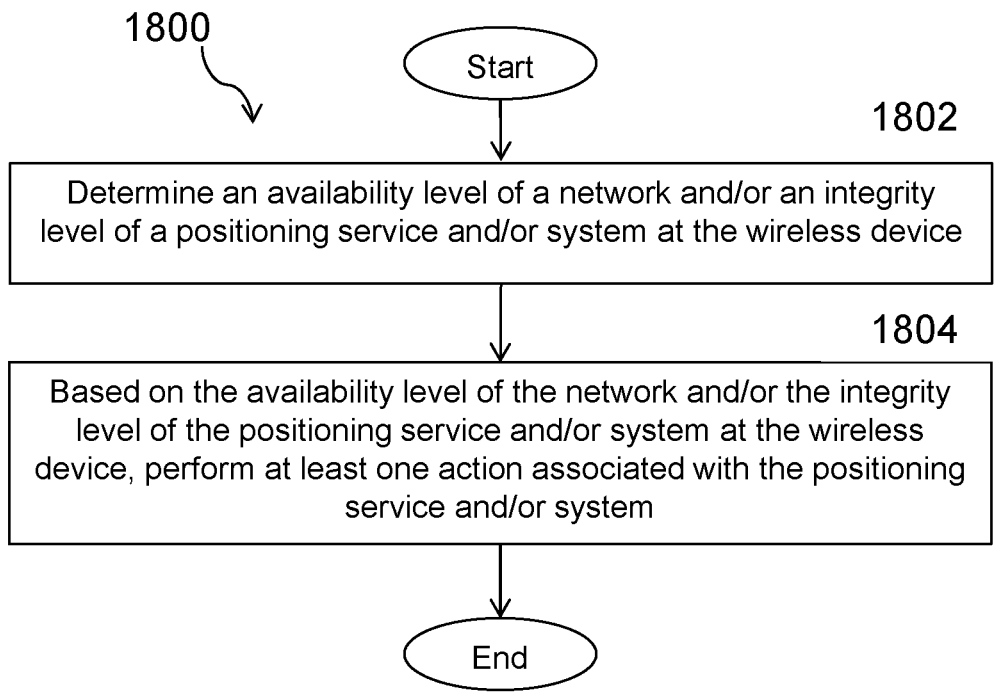
FIG. 25 illustrates another example method by a wireless device, according to certain embodiments.

FIG. 25 depicts another method 1800 by a wireless device 110 in an IoT environment or network, according to certain embodiments. At step 1802, the wireless device 110 determines an availability level of a network and/or an integrity level of a positioning service and/or system at the wireless device. Based on the availability level of the network and/or the integrity level of the positioning service and/or system at the wireless device 110, the wireless device 110 performs at least one action associated with the positioning service and/or system, at step 1804.

In a particular embodiment, when performing the at least one action, the wireless device 110 transmits, to a network node 160, a first indication of the availability level of the network and/or the integrity level of the positioning service and/or system that was measured and/or met at the wireless device 110.

In a particular embodiment, when taking the at least one action, the wireless device 110 associates a time stamp with the availability level of the network and/or the integrity level of the positioning service and/or system.

In a further particular embodiment, the wireless device performs at least one of: storing the time stamp and the availability level of the network and/or the integrity level of the positioning service and/or system; and transmitting the time stamp to the network node 160.

In a particular embodiment, the wireless device 110 receives, from a network node 160, a second indication of an availability requirement of the network and/or an integrity requirement of the positioning service and/or system. The wireless device 110 determines whether the availability level of the network and/or the integrity level of the positioning service and/or system determined by the wireless device 110 meets or exceeds the availability requirement and/or the integrity requirement associated with the second indication received from the network node 160. The wireless device 110 transmits, to the network node 160, a third indication of whether the availability level of the network and/or the integrity level of the positioning service and/or system determined by the wireless device 110 meets or exceeds the availability requirement and/or the integrity requirement associated with the second indication received from the network node 160.

In a further particular embodiment, the second indication associates the integrity requirement and/or the availability requirement with a mode of the wireless device 110, and the wireless device 110 is configured to perform the positioning service according to the integrity requirement and/or the availability requirement when the wireless device is operating in the mode.

In a further particular embodiment, the wireless device 110 is in IDLE or INACTIVE mode.

In a further particular embodiment, the second indication of the availability requirement is associated with the network node 160.

In a further particular embodiment, the second indication of the availability requirement and/or the integrity requirement is associated with a particular zone.

In a further particular embodiment, the first indication of the integrity requirement and/or the availability requirement comprises a plurality of availability and/or integrity requirements, and each of the plurality of availability and/or integrity requirements is associated with a respective one of a plurality of zones.

In a further particular embodiment, the wireless device 110 receives from the network node 160, a fourth indication of a current zone of the wireless device 110. The wireless device 110 then determines a particular one of the plurality of availability requirements and/or integrity requirements that is associated with the current zone and performs the positioning service according to the particular one of the plurality of availability and/or integrity requirements that is associated with the current zone.

In a further particular embodiment, the wireless device 110 determines a current zone of the wireless device 110. The wireless device 110 then determines a particular one of the plurality of availability and/or integrity requirements that is associated with the current zone and performs the positioning service according to the particular one of the plurality of availability and/or integrity requirements that is associated with the current zone.

In a further particular embodiment, the wireless device 110 performs at least one of detecting the occurrence of an event and determining a particular one of the plurality of availability and/or integrity requirements that is associated with the event; and detecting an expiration of a timer and transitioning to a new one of the plurality of availability and/or integrity requirements.

In a particular embodiment, the first indication indicates a resolution level of the positioning service and/or system to the network node 160.

In a farther particular embodiment, the resolution level is a millimeter level.

Figure 26:
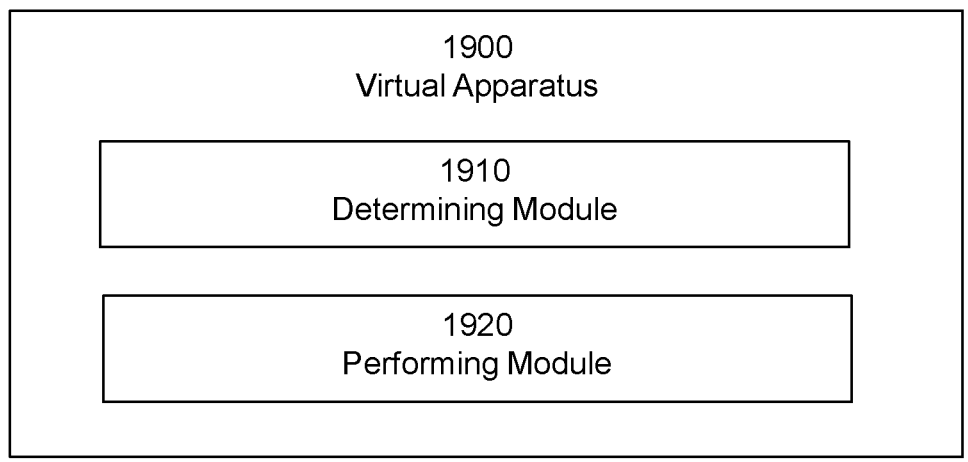
FIG. 26 illustrates another example virtual apparatus, according to certain embodiments.

FIG. 26 illustrates a schematic block diagram of a virtual apparatus 1900 in a wireless network (for example, the wireless network shown in FIG. 6) The apparatus may be implemented in a wireless device or network node (e.g., wireless device 110 or network node 160 shown in FIG. 6) Apparatus 1900 is operable to carry out the example method described with reference to FIG. 25 and possibly any other processes or methods disclosed herein. It is also to be understood that the method of FIG. 25 is not necessarily carried out solely by apparatus 1900. At least some operations of the method can be performed by one or more other entities.

Virtual Apparatus 1900 may comprise processing circuitry, which may include one or more microprocessor or microcontrollers, as well as other digital hardware which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause determining module 1910, performing module 1920, and any other suitable units of apparatus 1900 to perform corresponding functions according one or more embodiments of the present disclosure.

According to certain embodiments, receiving module 1910 may perform certain of the determining functions of the apparatus 1900. For example, determining module 1910 may determine an availability level of a network and/or an integrity level of a positioning service and/or system at the wireless device.

According to certain embodiments, performing module 1920 may perform certain of the performing functions of the apparatus 1900. For example, performing module 1920 may perform at least one action associated with the positioning service and/or system based on the availability level of the network and/or the integrity level of the positioning service and/or system at the wireless device 110.

Figure 27:
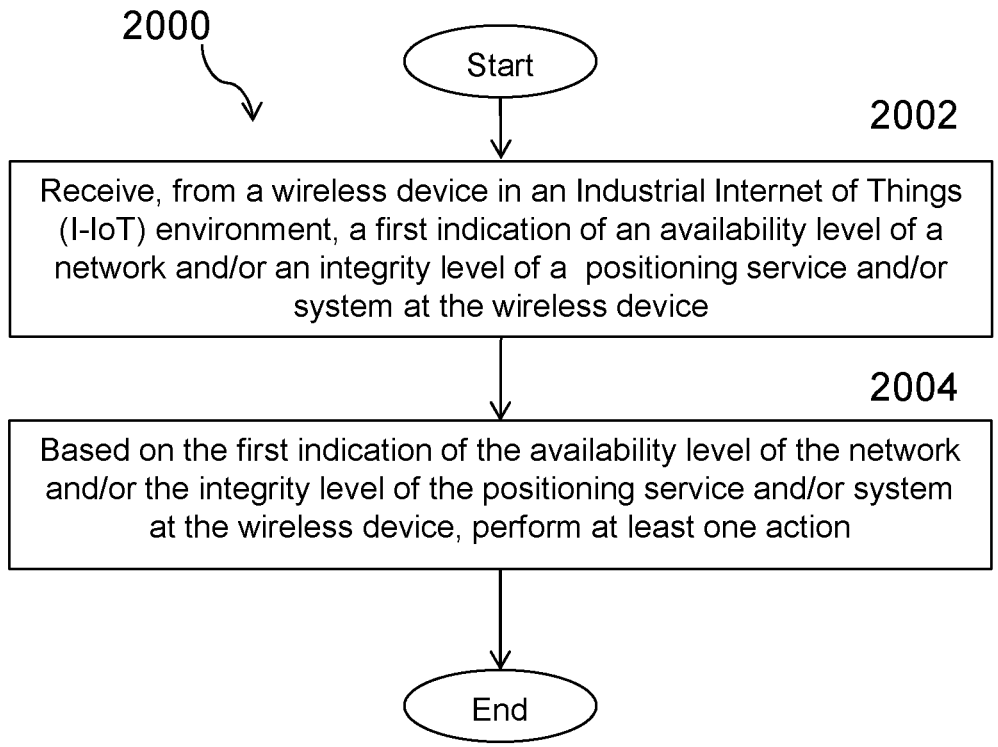
FIG. 27 illustrates another example method by a network node, according to certain embodiments.

FIG. 27 depicts another method 2000 by a network node 160, according to certain embodiments. At step 2002, the network node 160 receives, from a wireless device 110 in an I-IoT environment, a first indication of an availability level of a network and/or an integrity level of a positioning service and/or system at the wireless device. Based on the first indication of the availability level of the network and/or the integrity level of the positioning service and/or system at the wireless device, the network node 160 performs at least one action, at step 2004.

In a particular embodiment, the first indication of the availability level of the network and/or the integrity level of the positioning service and/or system is associated with a time stamp.

In a particular embodiment, when performing the at least one action, the network node 160 stores the time stamp and the availability level of the network and/or the integrity level of the positioning service and/or system.

In a particular embodiment, the network node 160 transmits to the wireless device 110 a second indication of an availability requirement of the network or an integrity requirement of the positioning service and/or system at the wireless device 110.

In a further particular embodiment, the network node 160 determines whether the availability level of the network and/or the integrity level of the positioning service and/or system received from the wireless device 110 associated with the first indication meets or exceeds the availability requirement and/or the integrity requirement associated with the second indication.

In a particular embodiment, the first indication from the wireless device 110 indicates whether the availability level of the network and/or the integrity level of the positioning service and/or system determined by the wireless device 110 meets or exceeds the availability, requirement and/or the integrity requirement associated with the second indication.

In a particular embodiment, the second indication from the network node 160 associates the availability requirement and/or the integrity requirement with a mode of the wireless device 110, and the wireless device 110 is configured to perform the positioning service according to the availability requirement and/or the integrity requirement when the wireless device is operating in the mode.

In a particular embodiment, the wireless device 110 is in IDLE or INACTIVE mode.

In a particular embodiment, the second indication of the availability requirement and/or the integrity requirement is associated with the network node 160.

In a particular embodiment, the second indication of the availability requirement and/or the integrity requirement is associated with a particular zone.

In a further particular embodiment, the second indication of the availability requirement and/or integrity requirement comprises a plurality of availability and/or integrity requirements, and each of the plurality of availability and/or integrity requirements is associated with a respective one of a plurality of zones.

In a further particular embodiment, the first indication indicates a resolution level of the positioning service and/or system to the network node.

In a particular embodiment, the resolution level is a millimeter level.

Figure 28:
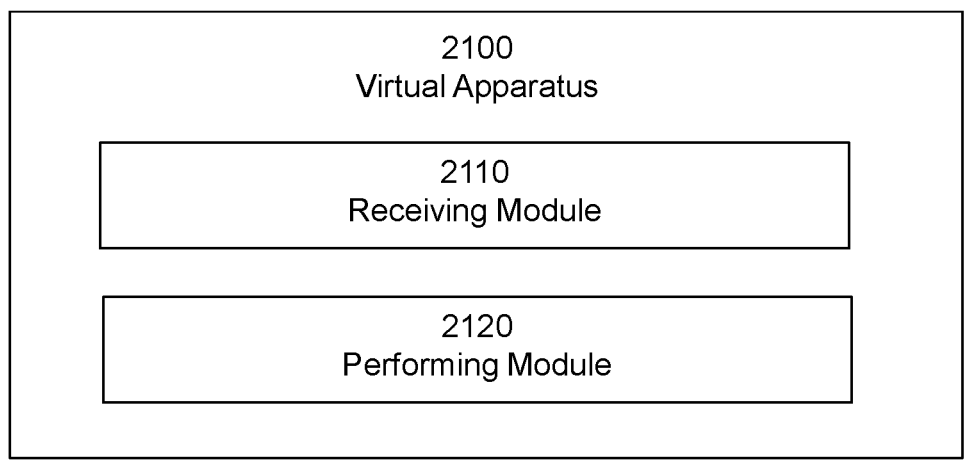
FIG. 28 illustrates another example virtual apparatus, according to certain embodiments.

FIG. 28 illustrates a schematic block diagram of a virtual apparatus 2100 in a wireless network (for example, the wireless network shown in FIG. 6). The apparatus may be implemented in a wireless device or network node (e.g., wireless device 110 or network node 160 shown in FIG. 6). Apparatus 2100 is operable to carry out the example method described with reference to FIG. 27 and possibly any other processes or methods disclosed herein. It is also to be understood that the method of FIG. 27 is not necessarily carried out solely by apparatus 2100. At least some operations of the method can be performed by one or more other entities.

Virtual Apparatus 2100 may comprise processing circuitry, which may include one or more microprocessor or microcontrollers, as well as other digital hardware, which may include digital signal processors (USPs), special-purpose digital logic, and the like. The processing circuitry may be configured to execute program code stored in memory, which may include one or several types of memory such as read-only, memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 2110, performing module 2120, and any other suitable units of apparatus 2100 to perform corresponding functions according one or more embodiments of the present disclosure.

According to certain embodiments, receiving module 2110 may perform certain of the receiving functions of the apparatus 2100. For example, receiving module 2110 may receive, from a wireless device 110 in an I-IoT environment, a first indication of an availability level of a network and/or an integrity level of a positioning service and/or system at the wireless device.

According to certain embodiments, performing module 2120 may perform certain of the performing functions of the apparatus 2100. For example, performing module 2120 may perform at least one action based on the first indication of the availability level of the network and/or the integrity level of the positioning service and/or system at the wireless device 110.

EXAMPLE EMBODIMENTS

Example Embodiment 1. A method performed by a wireless device in an Internet of Things (IoT) environment, the method comprising: determining an availability level and/or integrity level of a positioning service and/or system at the wireless device; and transmitting, to a network node, the availability level and/or integrity level of the positioning service and/or system at the wireless device.

Example Embodiment 2. The method of Embodiment 1, wherein the availability level and/or integrity level of the positioning service and/or system is transmitted using 3-bit encoding.

Example Embodiment 3 The method of any one of Embodiments 1 to 2, wherein one bit is used to indicate a resolution level of the positioning service and/or system to the network node.

Example Embodiment 4. The method of Embodiment 3, wherein the resolution level is a millimeter level.

Example Embodiment 5. The method of any one of Embodiments 1 to 4, further comprising associating a time stamp with the availability level and/or integrating level of the positioning service and/or system.

Example Embodiment 6. The method of Embodiment 5, further comprising storing the time stamp and the availability level and/or integrating level of the positioning service and/or system.

Example Embodiment 7. The method of any one of Embodiments 5 to 6, further comprising transmitting the time stamp to the network node.

Example Embodiment 8. The method of any one of Embodiments 1 to 7, further comprising receiving, from a network node, an indication of an integrity and/or availability requirement of the positioning service and/or system.

Example Embodiment 9. The method of Embodiment 8, further comprising determining whether the availability level and/or integrating level of the positioning service and/or system determined by the wireless device meets or exceeds the integrity and/or availability requirement received from the network node.

Example Embodiment 10. The method of any one of Embodiments 8 to 9, wherein transmitting the availability level and/or integrity level of the positioning service and/or system to the network node comprises transmitting an indication of whether the availability level and/or integrating level of the positioning service and/or system determined by the wireless device meets or exceeds the integrity and/or availability requirement received from the network node.

Example Embodiment 11. The method of any one of Embodiments 8 to 10, wherein the indication of an integrity and/or availability requirement is received as one or more Master information Blocks (MIBs) or System Information Blocks (SIBs).

Example Embodiment 12. The method of any one of Embodiments 8 to 11, wherein the indication of an integrity and/or availability requirement is received via broadcast or multicast Example Embodiment 13. The method of any one of Embodiments 8 to 12, wherein the indication associates the integrity and/or availability requirement is a mode of the wireless device such that the wireless device is to perform the positioning service according to the integrity and/or availability requirement when the wireless device is operating in the mode.

Example Embodiment 14. The method of any one of Embodiments 8 to 13, wherein the indication of the integrity and/or availability requirement is associated with the particular network node.

Example Embodiment 15. The method of any one of Embodiments 8 to 14, wherein the indication of the integrity and/or availability requirement is associated with a particular zone.

Example Embodiment 16. The method of any one of Embodiments 8 to 14, wherein the indication of the integrity and/or availability requirement comprises a plurality of integrity and/or availability requirements, wherein each of the plurality of integrity and/or availability requirements is associated with a respective one of a plurality of zones.

Example Embodiment 17. The method of Embodiment 16, further comprising receiving, from the network node, an indication of a current zone of the wireless device, determining a particular one of the plurality of integrity and/or availability requirements that is associated with the current zone, and performing the positioning service according to the particular one of the plurality of integrity and/or availability requirements that is associated with the current zone.

Example Embodiment 18. The method of Embodiment 16, further comprising determining a current zone of the wireless device, determining a particular one of the plurality of integrity and/or availability requirements that is associated with the current zone, and performing the positioning service according to the particular one of the plurality of integrity and/or availability requirements that is associated with the current zone.

Example Embodiment 19. The method of any Embodiment 16, further comprising detecting the occurrence of an event and determining a particular one of the plurality of integrity and/or availability requirements that is associated with the event.

Example Embodiment 20. The method of Embodiment 16, further comprising detecting an expiration of a timer and transitioning to a new one of the plurality of integrity and/or availability requirements.

Example Embodiment 21. The method of any one of Embodiments 1 to 11, wherein the wireless device is in IDLE or INACTIVE mode.

Example Embodiment 22. The method of any one of Embodiments 1 to 11, wherein the IoT environment comprises an I-IoT environment.

Example Embodiment 23. A computer program comprising instructions which when executed on a computer perform any of the methods of Example Embodiments 1 to 22.

Example Embodiment 24. A computer program product comprising computer program, the computer program comprising instructions which when executed on a computer perform any of the methods of Example Embodiments 1 to 22.

Example Embodiment 25. A non-transitory computer readable medium storing instructions which when executed by a computer perform any of the methods of Example Embodiments 1 to 22.

Example Embodiment 26. A method performed by a wireless device in an Internet of Things (IoT) environment, the method comprising receiving, from a network node, an availability level and/or integrity level requirement of a positioning service and/or system at the wireless device; and performing, by the wireless device, at least one action associated with the positioning service and/or system according to or based on the availability level and/or integrity level requirement.

Example Embodiment 27. The method of Embodiment 27, further comprising determining a current availability level and/or integrity level of the positioning service and/or system; and determining whether the current availability level and/or integrity level meets or exceeds the availability level and/or integrity level requirement received from the network node.

Example Embodiment 28. The method of Embodiment 28, further comprising transmitting, to the network node, an indication of at least one of: the current availability level and/or integrity level of the positioning service and/or system; and/or whether the current availability level and/or integrity level meets or exceeds the availability level and/or integrity level requirement received from the network node.

Example Embodiment 29. The method of Embodiment 28, wherein indication transmitted to the network node is transmitted using 3-bit encoding.

Example Embodiment 30. The method of any one of Embodiments 28 to 29, wherein one bit is used to indicate the resolution level of the positioning service and/or system to the network node.

Example Embodiment 31. The method of Embodiment 30, wherein the resolution level is a millimeter level.

Example Embodiment 32. The method of any one of Embodiments 28 to 31 further comprising associating a time stamp with current the availability level and/or integrating level of the positioning service and/or system.

Example Embodiment 33. The method of Embodiment 32, further comprising storing the time stamp and the current availability level and/or integrating level of the positioning service and/or system.

Example Embodiment 34. The method of any one of Embodiments 32 to 33, further comprising transmitting the time stamp to the network node.

Example Embodiment 35. The method of any one of Embodiments 26 to 34, wherein the indication of an integrity and/or availability requirement is received as one or more Master Information Blocks (MIBs) or System Information Blocks (SIBS).

Example Embodiment 36. The method of any one of Embodiments 26 to 34, wherein the indication of an integrity and/or availability requirement is received via broadcast or multicast.

Example Embodiment 37. The method of any one of Embodiments 26 to 36, wherein the indication of the integrity and/or availability requirement is associated with a mode of the wireless device such that the wireless device is to perform the positioning service according to the integrity and/or availability requirement when the wireless device is operating in the mode.

Example Embodiment 38. The method of any one of Embodiments 26 to 37, wherein the indication of the integrity and/or availability requirement is associated with the particular network node.

Example Embodiment 39. The method of any one of Embodiments 26 to 38, wherein the indication of the integrity and/or availability requirement is associated with a particular zone.

Example Embodiment 40. The method of any one of Embodiments 26 to 39, wherein the indication of the integrity and/or availability requirement comprises a plurality of integrity and/or availability requirements, wherein each of the plurality of integrity and/or availability requirements is associated with a respective one of a plurality of zones.

Example Embodiment 41. The method of Embodiment 40, further comprising receiving, from the network node, an indication of a current zone of the wireless device, determining a particular one of the plurality of integrity and/or availability requirements that is associated with the current zone, and performing the positioning service according to the particular one of the plurality of integrity and/or availability requirements that is associated with the current zone.

Example Embodiment 42. The method of Embodiment 40, further comprising determining a current zone of the wireless device, determining a particular one of the plurality of integrity and/or availability requirements that is associated with the current zone, and performing the positioning service according to the particular one of the plurality of integrity and/or availability requirements that is associated with the current zone.

Example Embodiment 43. The method of any one of Embodiments 40 to 42, further comprising detecting the occurrence of an event and determining a particular one of the plurality of integrity and/or availability requirements that is associated with the event.

Example Embodiment 44. The method of any one of Embodiments 40 to 43, further comprising detecting an expiration of a timer and transitioning to a new one of the plurality of integrity and/or availability requirements.

Example Embodiment 45. The method of Embodiments 26 to 44, further comprising, starting a timer when the indication is received from the network node; upon expiration of the timer, determining that the availability level and/or integrity level requirement is no longer availability.

Example Embodiments 46 The method of any one of Embodiments 26 to 45, wherein the wireless device is in IDLE or INACTIVE mode.

Example Embodiment 47. The method of any one of Embodiments 26 to 46, wherein the IoT environment comprises an I-IoT environment.

Example Embodiment 48. A computer program comprising instructions which when executed on a computer perform any of the methods of Example Embodiments 26 to 48

Example Embodiment 49. A computer program product comprising computer program, the computer program comprising instructions which when executed on a computer perform any of the methods of Example Embodiments 26 to 48.

Example Embodiment 50. A non-transitory computer readable medium storing instructions which when executed by a computer perform any of the methods of Example Embodiments 26 to 48

Example Embodiment 51. A method performed by a network node, the method comprising: receiving, from a wireless device in an Internet of Things (IoT) environment, an indication of an availability level and/or integrity level of the positioning service and/or system at the wireless device.

Example Embodiment 52. The method of Embodiment 51, wherein the indication of the availability level and/or integrity level of the positioning service and/or system is transmitted using 3-bit encoding.

Example Embodiment 53. The method of any one of Embodiments 51 to 52, wherein one bit is used to indicate a resolution level of the positioning service and/or system to the network node.

Example Embodiment 54. The method of Embodiment 53, wherein the resolution level is a millimeter level.

Example Embodiment 55. The method of any one of Embodiments 51 to 54, wherein the indication of the availability level and/or integrating level of the positioning service and/or system is associated with a time stamp.

Example Embodiment 56. The method of Embodiment 65, further comprising storing the time stamp and the availability level and/or integrating level of the positioning service and/or system.

Example Embodiment 57. The method of any one of Embodiments 51 to 56, further comprising transmitting to the wireless device an indication of an integrity and/or availability requirement of the positioning service and/or system.

Example Embodiment 58. The method of Embodiment 57, further comprising determining whether the availability level and/or integrating level of the positioning service and/or system received from the wireless device meets or exceeds the integrity and/or availability requirement.

Example Embodiment 59. The method of any one of Embodiment 57, wherein the indication from the wireless device indicates whether the availability level and/or integrating level of the positioning service and/or system determined by the wireless device meets or exceeds the integrity and/or availability requirement.

Example Embodiment 60. The method of any one of Embodiments 57 to 59, wherein the indication of the integrity and/or availability requirement is transmitted as one or more Master Information Blocks (MIBs) or System information Blocks (SIBs)

Example Embodiment 61. The method of any one of Embodiments 57 to 59, wherein the indication of an integrity, and/or availability requirement is transmitted via broadcast or multicast.

Example Embodiment 62. The method of any one of Embodiments 57 to 61. Wherein the indication from the network node associates the integrity and/or availability requirement is a mode of the wireless device such that the wireless device is to perform the positioning service according to the integrity and/or availability requirement when the wireless device is operating in the mode.

Example Embodiment 63. The method of any one of Embodiments 57 to 62, wherein the indication of the integrity and/or availability requirement is associated with the network node.

Example Embodiment 64. The method of any one of Embodiments 57 to 63, wherein the indication of the integrity and/or availability requirement is associated with a particular zone.

Example Embodiment 65. The method of any one of Embodiments 57 to 64, wherein the indication of the integrity and/or availability requirement comprises a plurality of integrity and/or availability requirements, wherein each of the plurality of integrity and/or availability requirements is associated with a respective one of a plurality of zones.

Example Embodiment 66. The method of any one of Embodiments 51 to 65, wherein the wireless device is in IDLE or INACTIVE mode.

Example Embodiment 67. The method of any one of Embodiments 51 to 66, wherein the IoT environment comprises an I-IoT environment.

Example Embodiment 68. A computer program comprising instructions which when executed on a computer perform any of the methods of embodiments 51 to 67.

Example Embodiment 69. A computer program product comprising computer program, the computer program comprising instructions which when executed on a computer perform any of the methods of embodiments 51 to 67.

Example Embodiment 70. A non-transitory computer readable medium storm instructions which when executed by a computer perform any of the methods of embodiments 51 to 67.

Example Embodiment 71. A method performed by a network node, the method comprising: transmitting, to a wireless device in an Internet of Things (IoT) environment, an availability level and/or integrity level requirement of a positioning service and/or system at the wireless device.

Example Embodiment 72. The method of Embodiment 71, further comprising receiving, from the wireless device, an indication of at least one of: the current availability level and/or integrity level of the positioning service and/or system; and/or whether the current availability level and/or integrity level meets or exceeds the availability level and/or integrity level requirement received from the network node.

Example Embodiment 73. The method of Embodiment 72, wherein indication transmitted to the network node is transmitted using 3-bit encoding.

Example Embodiment 74. The method of any one of Embodiments 72 to 73, wherein one bit is used to indicate the resolution level of the positioning service and/or system to the network node Example Embodiment 75. The method of Embodiment 74, wherein the resolution level is a millimeter level.

Example Embodiment 76. The method of any one of Embodiments 73 to 75 wherein the indication comprises a time stamp associated with current the availability level and/or integrating level of the positioning service and/or system.

Example Embodiment 77. The method of Embodiment 76, further comprising storing the time stamp and the current availability level and/or integrating level of the positioning service and/or system.

Example Embodiment 78. The method of any one of Embodiments 71 to 77, wherein the indication of an integrity and/or availability requirement is transmitted as one or more Master Information Blocks (MIBs) or System Information Blocks (SIBS).

Example Embodiment 79. The method of any one of Embodiments 71 to 78, wherein the indication of an integrity and/or availability requirement is received via broadcast or multicast.

Example Embodiment 80. The method of any one of Embodiments 71 to 79, wherein the indication of the integrity and/or availability requirement is associated with a mode of the wireless device such that the wireless device is to perform the positioning service according to the integrity and/or availability requirement when the wireless device is operating in the mode.

Example Embodiment 81. The method of any one of Embodiments 71 to 80, wherein the indication of the integrity and/or availability requirement is associated with the particular network node.

Example Embodiment 82. The method of any one of Embodiments 71 to 81, wherein the indication of the integrity and/or availability requirement is associated with a particular zone.

Example Embodiment 83. The method of any one of Embodiments 72 to 82, wherein the indication of the integrity and/or availability requirement comprises a plurality of integrity and/or availability requirements, wherein each of the plurality of integrity and/or availability requirements is associated with a respective one of a plurality of zones.

Example Embodiment 84. The method of Embodiment 83, further comprising transmitting, to the wireless device, an indication of a current zone of the wireless device.

Example Embodiment 85. The method of Embodiments 71 to 85, further comprising: configuring the wireless device to start a timer when the indication is received from the network node; configuring the wireless device to, upon expiration of the timer, determine that the availability level and/or integrity level requirement is no longer availability.

Example Embodiments 86. The method of any one of Embodiments 71 to 85, wherein the wireless device is in IDLE or INACTIVE mode.

Example Embodiment 87. The method of any one of Embodiments 71 to 86, wherein the IoT environment comprises an I-IoT environment.

Example Embodiment 88. A computer program comprising instructions which when executed on a computer perform any of the methods of embodiments 71 to 87.

Example Embodiment 89. A computer program product comprising computer program, the computer program comprising instructions which when executed on a computer perform any of the methods of embodiments 71 to 88.

Example Embodiment 90. A non-transitory computer readable medium storing instructions which when executed by a computer perform any of the methods of embodiments 71 to 88.

Example Embodiment 91. A wireless device comprising: processing circuitry configured to perform any of the steps of any of Embodiments 1 to 50

Example Embodiment 92. The wireless device of Embodiment 91 further comprising power supply circuitry configured to supply power to the wireless device.

Example Embodiment 93. A network node comprising: processing circuitry configured to perform any of the steps of any of Embodiments 51 to 90.

Example Embodiment 94. The network node of Embodiment 93 further comprising power supply circuitry configured to supply power to the wireless device.

Example Embodiment 95. A wireless device, the wireless device comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of Embodiments 1 to 50; an input interface connected to the processing circuitry and configured to allow input of information into the wireless device to be processed by the processing circuitry; an output interface connected to the processing circuitry and configured to output information from the wireless device that has been processed b the processing circuitry; and a battery connected to the processing circuitry and configured to supply power to the wireless device.

Example Embodiment 96. A communication system including a host computer comprising: processing circuitry configured to provide user data; and a communication interface configured to forward the user data to a cellular network for transmission to a wireless device, wherein the cellular network comprises a network node having a radio interface and processing circuitry, the network node's processing circuitry configured to perform any of the steps of any of Embodiments 51 to 90.

Example Embodiment 97. The communication system of the pervious embodiment further including the network node.

Example Embodiment 98. The communication system of the previous 2 embodiments, further including the wireless device, wherein the wireless device is configured to communicate with the network node.

Example Embodiment 99. The communication system of the previous 3 embodiments, wherein: the processing circuitry of the host computer is configured to execute a host application, thereby providing the user data; and the wireless device comprises processing circuitry configured to execute a client application associated with the host application.

Example Embodiment 100. A method implemented in a communication system including a host computer, a network node and a wireless device, the method comprising: at the host computer, providing user data, and at the host computer, initiating a transmission carrying the user data to the wireless device via a cellular network comprising the network node, wherein the network node performs any of the steps of any of Embodiments 51 to 90.

Example Embodiment 101. The method of the previous embodiment, further comprising at the network node, transmitting the user data.

Example Embodiment 102. The method of the previous 2 embodiments, wherein the user data is provided at the host computer by executing a host application, the method further comprising, at the wireless device, executing a client application associated with the host application Example Embodiment 103. A wireless device configured to communicate with a network node, the wireless device comprising a radio interface and processing circuitry configured to performs the of the previous 3 embodiments.

Example Embodiment 104. A communication system including a host computer comprising: processing circuitry configured to provide user data; and a communication interface configured to forward user data to a cellular network for transmission to a wireless device, wherein the wireless device comprises a radio interface and processing circuitry, the wireless device's components configured to perform any of the steps of any of Embodiments 1 to 50.

Example Embodiment 105. The communication system of the previous embodiment, wherein the cellular network further includes a network node configured to communicate with the wireless device.

Example Embodiment 106 The communication system of the previous 2 embodiments, wherein: the processing circuitry of the host computer is configured to execute a host application, thereby providing the user data, and the wireless device's processing circuitry is configured to execute a client application associated with the host application.

Example Embodiment 107. A method implemented in a communication system including a host computer, a network node and a wireless device, the method comprising: at the host computer, providing user data; and at the host computer, initiating a transmission carrying the user data to the wireless device via a cellular network comprising the network node, wherein the wireless device performs any of the steps of any of Embodiments 1 to 50.

Example Embodiment 108. The method of the previous embodiment, further comprising at the wireless device, receiving the user data from the network node.

Example Embodiment 109. A communication system including a host computer comprising: communication interface configured to receive user data originating from a transmission from a wireless device to a network node, wherein the wireless device comprises a radio interface and processing circuitry, the wireless device's processing circuitry configured to perform any of the steps of any of Embodiments 1 to 50.

Example Embodiment 110. The communication system of the previous embodiment, further including the wireless device.

Example Embodiment 111. The communication system of the previous 2 embodiments, further including the network node, wherein the network node comprises a radio interface configured to communicate with the wireless device and a communication interface configured to forward to the host computer the user data carried by a transmission from the wireless device to the network node.

Example Embodiment 112 The communication system of the previous 3 embodiments, wherein: the processing circuitry of the host computer is configured to execute a host application, and the wireless device's processing circuitry is configured to execute a client application associated with the host application, thereby providing the user data.

Example Embodiment 113. The communication system of the previous 4 embodiments, wherein: the processing circuitry of the host computer is configured to execute a host application, thereby providing request data; and the wireless device's processing circuitry is configured to execute a client application associated with the host application, thereby providing the user data in response to the request data.

Example Embodiment 114. A method implemented in a communication system including a host computer, a network node and a wireless device, the method comprising: at the host computer, receiving user data transmitted to the network node from the wireless device, wherein the wireless device performs any of the steps of any of Embodiments 1 to 50.

Example Embodiment 115. The method of the previous embodiment, further comprising, at the wireless device, providing the user data to the network node.

Example Embodiment 116. The method of the previous 2 embodiments, further comprising: at the wireless device, executing a client application, thereby providing the user data to be transmitted; and at the host computer, executing a host application associated with the client application.

Example Embodiment 117. The method of the previous 3 embodiments, further comprising: at the wireless device, executing a client application; and at the wireless device, receiving input data to the client application, the input data being provided at the host computer by executing a host application associated with the client application, wherein the user data to be transmitted is provided by the client application in response to the input data.

Example Embodiment 118 A communication system including a host computer comprising a communication interface configured to receive user data originating from a transmission from a wireless device to a network node, wherein the network node comprises a radio interface and processing circuitry, the network node's processing circuitry configured to perform any of the steps of any of Embodiments 51 to 90.

Example Embodiment 119. The communication system of the previous embodiment further including the network node.

Example Embodiment 120. The communication system of the previous 2 embodiments, further including the wireless device, wherein the wireless device is configured to communicate with the network node.

Example Embodiment 121. The communication system of the previous 3 embodiments, wherein: the processing circuitry of the host computer is configured to execute a host application; the wireless device is configured to execute a client application associated with the host application, thereby providing the user data to be received by the host computer.

Example Embodiment 122. A method implemented in a communication system including a host computer, a network node and a wireless device, the method comprising: at the host computer, receiving, from the base station, user data originating from a transmission which the network node has received from the wireless device, wherein the wireless device performs any of the steps of any of Embodiments 1 to 50.

Example Embodiment 123. The method of the previous embodiment, further comprising at the network node receiving the user data from the wireless device.

Example Embodiment 124. The method of the previous 2 embodiments, further comprising at the network node, initiating a transmission of the received user data to the host computer.

Example Embodiment 125 The method of any of the previous embodiments, wherein the network node comprises a base station Example Embodiment 126. The method of any of the previous embodiments, wherein the wireless device comprises a user equipment (UE).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method performed by a wireless device in an Industrial Internet of Things, I-IoT, environment, the method comprising:
   determining an availability level of a network and/or an integrity level of a positioning service and/or system at the wireless device;
   receiving, from a network node, a first indication of an availability requirement of the network and/or an integrity requirement of the positioning service and/or system;

determining whether the availability level of the network and/or the integrity level of the of the positioning service and/or system as determined by the wireless device meets or exceeds the availability requirement and/or the integrity requirement from the network node; and transmitting, to the network node, a second indication of whether the availability level of the network and/or the integrity level of the positioning service and/or system determined by the wireless device meets or exceeds the availability requirement and/or the integrity requirement received from the network node.

2. A method performed by a network node, the method comprising:

receiving, from a wireless device in an Industrial Internet of Things, I-IoT, environment, a first indication of an availability level of a network and/or an integrity level of a positioning service and/or system at the wireless device;

transmitting to the wireless device a second indication of an availability requirement of the network or an integrity requirement of the positioning service and/or system at the wireless device; and based on the first indication of the availability level of the network and/or the integrity level of the positioning service and/or system at the wireless device, performing at least one action.

3. A wireless device in an Industrial Internet of Things, I-IoT, environment, the wireless device comprising:

processing circuitry configured to:

determine an availability level of a network and/or an integrity level of a positioning service and/or system at the wireless device;

receive, from a network node, a first indication of an availability requirement of the network and/or an integrity requirement of the positioning service and/or system;

determine whether the availability level of the network and/or the integrity level of the of the positioning service and/or system as determined by the wireless device meets or exceeds the availability requirement and/or the integrity requirement from the network node; and transmit, to the network node, a second indication of whether the availability level of the network and/or the integrity level of the positioning service and/or system determined by the wireless device meets or exceeds the availability requirement and/or the integrity requirement received from the network node.

4. The wireless device of claim 3, wherein the processing circuitry is configured to transmit, to a network node (160), a third indication of the availability level of the network and/or the integrity level of the positioning service and/or system that was measured and/or met at the wireless device.

5. The wireless device of claim 3, wherein the processing circuitry is configured to associate a time stamp with the availability level of the network and/or the integrity level of the positioning service and/or system.

6. The wireless device of claim 5, wherein the processing circuitry is configured to perform at least one of:

store the time stamp and the availability level of the network and/or the integrity level of the positioning service and/or system; and transmit the time stamp to the network node.

7. The wireless device of claim 3, wherein the first indication associates the integrity requirement and/or the availability requirement with a mode of the wireless device, and wherein the processing circuitry is configured to perform the positioning service according to the integrity requirement and/or the availability requirement when the wireless device is operating in the mode.

8. The wireless device of claim 7, wherein the wireless device is in IDLE or INACTIVE mode.

9. The wireless device of any one of claim 3, wherein the first indication of the availability requirement is associated with the network node.

10. The wireless device of any one of claim 3, wherein the first indication of the availability requirement and/or the integrity requirement is associated with a particular zone.

11. The wireless device of any one of claim 3, wherein the first indication of the integrity requirement and/or the availability requirement comprises a plurality of availability and/or integrity requirements, wherein each of the plurality of availability and/or integrity requirements is associated with a respective one of a plurality of zones.

12. The wireless device of claim 11, wherein the processing circuitry is configured to:

receive, from the network node, a fourth indication of a current zone of the wireless device;

determine a particular one of the plurality of availability requirements and/or integrity requirements that is associated with the current zone, and perform a positioning service according to the particular one of the plurality of availability and/or integrity requirements that is associated with the current zone.

13. The wireless device of claim 11, wherein the processing circuitry is configured to:

determine a current zone of the wireless device, determine a particular one of the plurality of availability and/or integrity requirements that is associated with the current zone, and perform the positioning service according to the particular one of the plurality of availability and/or integrity requirements that is associated with the current zone.

14. The wireless device of claim 11, wherein the processing circuitry is configured to perform at least one of:

detecting the occurrence of an event and determining a particular one of the plurality of availability and/or integrity requirements that is associated with the event; and detecting an expiration of a timer and transitioning to a new one of the plurality of availability and/or integrity requirements.

15. The wireless device of claim 4, wherein the third indication indicates a resolution level of the positioning service and/or system to the network node.

16. The wireless device of claim 15, wherein the resolution level is a millimeter level.

17. A network node comprising:

processing circuitry configured to:

receive, from a wireless device in an Industrial Internet of Things, I-IoT, environment, a first indication of an availability level of a network and/or an integrity level of a positioning service and/or system at the wireless device;

transmit to the wireless device a second indication of an availability requirement of the network or an integrity requirement of the positioning service and/or system at the wireless device; and based on the first indication of the availability level of the network and/or the integrity level of the positioning service and/or system at the wireless device, perform at least one action.

18. The network node of claim 17, wherein the first indication of the availability level of the network and/or the integrity level of the positioning service and/or system is associated with a time stamp.

19. The network node of claim 18, wherein when performing the at least one action the processing circuitry is configured to perform at least one of:
storing the time stamp and the availability level of the network and/or the integrity level of the positioning service and/or system.

20. The network node of claim 17, wherein the processing circuitry is configured to determine whether the availability level of the network and/or the integrity level of the positioning service and/or system received from the wireless device associated with the first indication meets or exceeds the availability requirement and/or the integrity requirement associated with the second indication.

21. The network node of claim 17, wherein the first indication from the wireless device indicates whether the availability level of the network and/or the integrity level of the positioning service and/or system determined by the wireless device meets or exceeds the availability requirement and/or the integrity requirement associated with the second indication.

22. The network node of any one of claim 17, wherein the second indication from the network node associates the availability requirement and/or the integrity requirement with a mode of the wireless device while in IDLE or INACTIVE mode.

23. The network node of any one of claim 17, wherein the second indication of the availability requirement and/or the integrity requirement is associated with the network node.

24. The method of any one of claim 17, wherein the second indication of the availability requirement and/or the integrity requirement is associated with a particular zone.

25. The method of any one of claim 17, wherein the second indication of the availability requirement and/or integrity requirement comprises a plurality of availability and/or integrity requirements, wherein each of the plurality of availability and/or integrity requirements is associated with a respective one of a plurality of zones.

26. The method of claim 17, wherein the first indication indicates a resolution level of the positioning service and/or system to the network node.

27. The method of claim 26, wherein the resolution level is a millimeter level.

* * * * *